(12) United States Patent
Kwon et al.

(10) Patent No.: US 11,765,713 B2
(45) Date of Patent: Sep. 19, 2023

(54) METHOD AND APPARATUS FOR WIRELESS COMMUNICATIONS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 71 days.

(21) Appl. No.: 17/239,402

(22) Filed: Apr. 23, 2021

(65) Prior Publication Data

US 2021/0337564 A1  Oct. 28, 2021

Related U.S. Application Data

(60) Provisional application No. 63/063,600, filed on Aug. 10, 2020, provisional application No. 63/054,824, filed on Jul. 22, 2020, provisional application No. 63/022,521, filed on May 10, 2020, provisional application No. 63/015,222, filed on Apr. 24, 2020.

(51) Int. Cl.
| | |
|---|---|
| *H04W 72/1263* | (2023.01) |
| *H04L 1/00* | (2006.01) |
| *H04W 72/0446* | (2023.01) |
| *H04W 72/50* | (2023.01) |
| *H04W 80/02* | (2009.01) |

(52) U.S. Cl.
CPC ....... *H04W 72/1263* (2013.01); *H04L 1/0003* (2013.01); *H04L 1/0008* (2013.01); *H04W 72/0446* (2013.01); *H04W 72/535* (2023.01); *H04W 80/02* (2013.01)

(58) Field of Classification Search
CPC ......... H04W 72/1263; H04W 72/0446; H04W 72/1257; H04W 80/02; H04L 1/0003; H04L 1/0008
USPC .......................................................... 370/329
See application file for complete search history.

(56) References Cited

U.S. PATENT DOCUMENTS

| | | | |
|---|---|---|---|
| 10,219,271 B1 * | 2/2019 | Hedayat | H04L 5/0055 |
| 2018/0227913 A1 * | 8/2018 | Seok | H04W 72/0446 |
| 2019/0097850 A1 * | 3/2019 | Kenney | H04L 5/0044 |
| 2021/0315009 A1 * | 10/2021 | Xia | H04W 8/04 |

OTHER PUBLICATIONS 63003347P (Year: 2020).*
Matthew Fischer, "MLO Synchronous Transmission" (Year: 2020).*
(Continued)

*Primary Examiner* — Intekhaab A Siddiquee

(57) ABSTRACT

Embodiments of a method and an apparatus for wireless communications are disclosed. In an embodiment, a method for wireless communications involves, at a first station (STA), transmitting a first Physical Layer Protocol Data Unit (PPDU) that includes a first frame to a second STA, wherein the first frame indicates a first duration of a second PPDU that is transmitted subsequent to the first PPDU by a single STA, wherein a non-Trigger-Based (non-TB) PPDU format is used for the second PPDU, and wherein the first frame solicits a response frame included as part of the second PPDU, and at the first STA, receiving from the second STA, the second PPDU that includes the response frame.

19 Claims, 13 Drawing Sheets

(56) References Cited

OTHER PUBLICATIONS

IEEE, "IEEE P802.11ax™/D3.1", Draft Standard for Information technology—Telecommunications and information exchange between systems Local and metropolitan area networks Specific requirements, Aug. 2018, 682 pgs.

IEEE, "IEEE P802.11ax™/D6.0", Draft Standard for Information technology—Telecommunications and information exchange between systems Local and metropolitan area networks Specific requirements, Nov. 2019, 780 pgs.

Fischer, Mattew, "MLO Synchronous Transmission", doc.: IEEE 802.11-20/0081r0, Jan. 10, 2020, 59 pgs.

* cited by examiner

METHOD AND APPARATUS FOR WIRELESS COMMUNICATIONS

CROSS-REFERENCE TO RELATED APPLICATIONS

This application is entitled to the benefit of U.S. Provisional Patent Application Ser. No. 63/015,222, filed on Apr. 24, 2020, and U.S. Provisional Patent Application Ser. No. 63/022,521, filed on May 10, 2020, and U.S. Provisional Patent Application Ser. No. 63/054,824, filed on Jul. 22, 2020, and U.S. Provisional Patent Application Ser. No. 63/063,600, filed on Aug. 10, 2020, each of which is incorporated by reference herein.

BACKGROUND

In wireless communications, wireless devices, e.g., Access Point (AP) multi-link devices (MLDs) or non-AP MLDs, e.g., station (STA) multi-link devices (STA MLDs), can execute various multi-link operations, such as transmission and reception of frames via one or more communication links. As an example, a wireless AP MLD may simultaneously transmit and receive Physical Layer Protocol Data Units (PPDUs) with a wireless non-AP MLD on multiple links to exchange information and transmit data. However, in typical wireless communications technology, there may be instances when at least one of the wireless devices may not support simultaneous transmission and reception (STR) of frames on multiple links. Therefore, there is a need for wireless communication techniques that may enable STR in non-STR (NSTR) wireless devices to improve the efficiency of wireless device communications.

SUMMARY

Embodiments of a method and an apparatus for wireless communications are disclosed. In an embodiment, a method for wireless communications involves, at a first station (STA), transmitting a first Physical Layer Protocol Data Unit (PPDU) that includes a first frame to a second STA, wherein the first frame indicates a first duration of a second PPDU that is transmitted subsequent to the first PPDU by a single STA, wherein a non-Trigger-Based (non-TB) PPDU format is used for the second PPDU, and wherein the first frame solicits a response frame included as part of the second PPDU, and at the first STA, receiving from the second STA, the second PPDU that includes the response frame.

In an embodiment, the first frame explicitly indicates the first duration of the second PPDU.

In an embodiment, the first frame implicitly indicates the first duration of the second PPDU.

In an embodiment, an A-Control subfield of a Media Access Control (MAC) header portion of the first frame indicates the first duration of the second PPDU that is transmitted subsequent to the first PPDU by the single STA, and wherein the non-TB PPDU format is used for the second PPDU.

In an embodiment, the first duration of the second PPDU is a maximum allowable duration indicated by a Single Response Scheduling (SRS) control subfield of an A-Control subfield in a MAC header portion of the first frame.

In an embodiment, the second STA transmits the second PPDU in response to the reception of the first PPDU, and wherein a difference between the first duration of the second PPDU indicated by the first PPDU and an actual duration of the second PPDU is less than a threshold value.

In an embodiment, the second STA determines a PPDU format for the second PPDU.

In an embodiment, the PPDU format for the second PPDU is at least one of a High-Efficiency (HE) PPDU and an Extremely High Throughput (EHT) PPDU.

In an embodiment, the second STA determines a Modulation and Coding Scheme (MCS) for the second PPDU that is no greater than the MCS of the first PPDU.

In an embodiment, the second STA determines a data rate for the second PPDU that is no greater than the data rate of the first PPDU.

In an embodiment, the first STA indicates that the first STA is capable of aligning transmission end times of down-link (DL) PPDUs that are transmitted simultaneously on multiple links to the second STA and up-link (UL) PPDUs that are subsequently scheduled simultaneously on multiple links from the second STA.

In an embodiment, at least one of the DL PPDUs transmitted by the first STA includes trigger information.

In an embodiment, the DL PPDUs indicate that the first STA intends to continue DL transmissions after receiving the UL PPDUs from the second STA.

In an embodiment, the DL PPDUs transmitted after receiving the UL PPDUs from the second STA avoid overlap with subsequent UL PPDUs from the second STA.

In an embodiment, the first PPDU includes a Trigger frame and a MAC Protocol Data Unit (MPDU) which solicit a response included in a Trigger-Based (TB) PPDU from a single STA, and wherein an Acknowledgement (Ack) Policy is set to at least one of a Normal Ack and an Implicit Block Ack Request (BAR) in the first MPDU included in the first PPDU.

In an embodiment, the first STA and a third STA are affiliated with a first MLD and the second STA and a fourth STA are affiliated with a second MLD, wherein the third STA transmits another PPDU which solicits another response frame on another link to the fourth STA, wherein a difference between a transmission end time of the first PPDU and a transmission end time of the other PPDU is within a first predetermined margin, and wherein a difference between a transmission end time of the response frame to the first PPDU and a transmission end time of the other response frame to the other PPDU is within a second predetermined margin.

In an embodiment, the first STA and a third STA are affiliated with a first MLD and the second STA and a fourth STA are affiliated with a second MLD, wherein the third STA transmits another PPDU which solicits another response frame on another link to the fourth STA, wherein a difference between a transmission end time of the first PPDU and a transmission end time of the other PPDU is within a first predetermined margin, and wherein a difference between a duration of the response frame to the first PPDU and a duration of the other response frame to the other PPDU is within a second predetermined margin.

In an embodiment, the first STA and the second STA are compatible with an Institute of Electrical and Electronics Engineers (IEEE) 802.11 protocol.

An embodiment of a STA is also disclosed. The STA includes a processor configured to transmit a first PPDU that includes a first frame to a second STA, wherein the first frame indicates a first duration of a second PPDU that is transmitted subsequent to the first PPDU by a single STA, wherein a non-TB PPDU format is used for the second PPDU, and wherein the first frame solicits a response frame included as part of the second PPDU, and receive, from the second STA, the second PPDU that includes the response frame.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
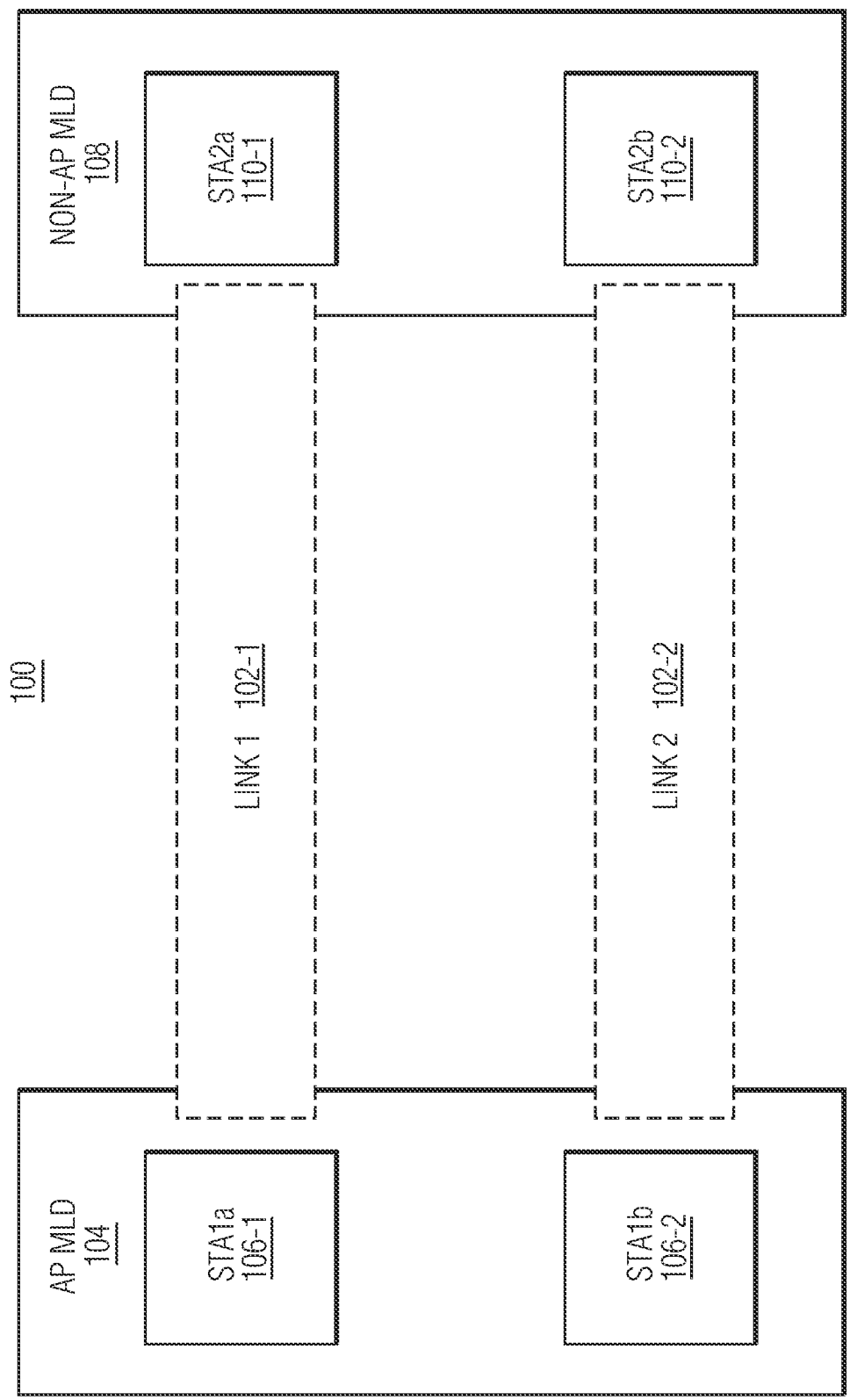
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a multi-link device (MLD) (e.g., wireless device) of a wireless local area network (WLAN) transmits data to at least one associated MLD. The MLD is configured to operate with associated MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated stations (STAs) of MLDs within range of an MLD operating according to the EHT communication protocol are configured to operate according to at least one other communication protocol, but are generally affiliated with lower data throughput protocols. The lower data throughput communication protocols (e.g., IEEE 802.11n, IEEE 802.11ac, IEEE 802.11ax, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one Access Point (AP) MLD, which is implemented as AP MLD 104, and one non-AP MLD, which is implemented as non-AP MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one non-AP MLD, or multiple AP MLDs with more than one non-AP MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as stations (STAs) 106-1 and 106-2. In such an embodiment, each radio may be operating on a different link. Additionally, in such an embodiment, the STAs may be STA1a 106-1 and STA1b 106-2. In some embodiments, the AP MLD 104 implements upper layer Media Access Control (MAC) functionalities (e.g., block acknowledgement establishment, reordering of frames, etc.) and the STAs 106-1 and 106-2 implement lower layer MAC functionalities (e.g., backoff, frame transmission, frame reception, etc.). The STAs 106-1 and 106-2 may be implemented in hardware (e.g., circuits), software, firmware, or a combination thereof. The STAs 106-1 and 106-2 may be fully or partially implemented as an integrated circuit (IC) device. In some embodiments, the STAs 106-1 and 106-2 are wireless STAs compatible with at least one WLAN communications protocol (e.g., at least one IEEE 802.11 protocol). For example, the STAs 106-1 and 106-2 may be wireless STAs compatible with the IEEE 802.11be protocol. In some embodiments, a STA is a wireless STA that connects to a local area network (e.g., a LAN) and/or to a backbone network (e.g., the Internet) through a wired connection and that wirelessly connects to associated wireless STAs, for example, through one or more WLAN communications protocols, such as the IEEE 802.11 protocol. In some embodiments, each STA of the AP MLD 104 includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the STAs 106-1 or 106-2 of the AP MLD 104 may operate in a different channel. For example, STA1a 106-1 may operate in a first channel and STA1b 106-2 may operate in a second channel. Although the AP MLD 104 is shown in FIG. 1 as including two STAs, other embodiments of the AP MLD 104 may include more than two STAs.

In the embodiment depicted in FIG. 1, the non-AP MLD, implemented as non-AP MLD 108, includes two radios which are implemented as STAs 110-1 and 110-2. In such an embodiment, the STAs may be STA2a 110-1 and STA2b 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the STAs 110-1 and 110-2 are part of the non-AP MLD 108, such that the non-AP MLD is a communications device that wirelessly connects to wireless STAs (e.g., STA1a 106-1 and/or STA1b 106-2). For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface. In some embodiments, the AP MLD 104 and/or the non-AP MLD 108 identifies which communication links support the multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA2a 110-1 may operate in the 2.4 GHz frequency band and STA2b 110-2 may operate in the 5 GHz frequency band. In some embodiments, each STA of the non-AP MLD 108 includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., link1 102-1 and link2 102-2. For example, each of the STAs 110-1 or 110-2 communicates with STA1a 106-1 or STA1b 106-2 via corresponding communication links 102-1 or 102-2. In an embodiment, a communication link (e.g., link1 102-1 or link2 102-2) may include a Basic Service Set (BSS) operating channel established by a STA (e.g., STA1a 106-1 or STA1b 106-2) that features multiple 20 MHz channels used to transmit frames (e.g., Physical Layer Protocol Data Units (PPDUs), Beacons, management frames, etc.) between a first wireless device (e.g., a STA) and a second wireless device (e.g., another STA). In some embodiments, a 20 MHz channel may be a punctured 20 MHz channel or an unpunctured 20 MHz channel. In some embodiments, the 20 MHz channels may be aggregated to form a subchannel (e.g., an 80 MHz subchannel or a 160 MHz subchannel). Although the non-AP MLD 108 is shown in FIG. 1 as including two STAs, other embodiments of the non-AP MLD 108 may include one STA or more than two STAs. In addition, although the AP MLD 104 communicates (e.g., wirelessly communicates) with the non-AP MLD 108 via multiple links 102-1 and 102-2, in other embodiments, the AP MLD 104 may communicate (e.g., wirelessly communicates) with the non-AP MLD 108 via one link or more than two communication links.

In one embodiment, an MLD (e.g., AP MLD 104 and/or non-AP MLD 108) may have a simultaneous transmit and receive capability (STR), which may be referred to herein as an "STR MLD" and implies that the MLD may transmit on one link (e.g., link1) and receive on another link (e.g., link2) simultaneously. In another embodiment, an MLD (e.g., AP MLD 104 and/or non-AP MLD 108) may have a non-simultaneous transmission and reception capability (NSTR), which may be referred to herein as an "NSTR MLD" and implies that the MLD may not transmit on one link (e.g., link1) and receive on another link (e.g., link2) simultaneously. In such embodiments, "simultaneously" may be defined as including frame transmissions which overlap or as a margin within ±4 μs. However, in some embodiments, the margin may not be limited to within ±4 μs and may be within, for example, ±5 μs, ±6 μs, ±7 μs, etc. In some embodiments, an MLD that supports multiple links (e.g., link1 and link2) may announce whether it can support transmission on one link (e.g., link1) concurrent with reception on another link (e.g., link2) for each pair of links. In such an embodiment, link1 and link2 may be on different channels. According to the 802.11be communication protocol, an NSTR MLD may be allowed to operate on such a pair of links.

In a multi-link operation, if an MLD (e.g., NSTR MLD) does not support concurrent transmission on one link (e.g., link1) and reception on another link (e.g., link2) on the supported links of the MLD, then the transmissions on each link (e.g., link1 and link2) need to end at the same time (e.g., within a margin of ±4 μs), such that the MLD may be enabled to support simultaneous transmission and reception on multiple links even if the MLD is an NSTR MLD. However, if a first MLD transmits frames carried by PPDUs on multiple links (e.g., link1 and link2) to a second MLD, and each transmitted frame solicits immediate response frames (sometimes referred to herein as "response frames") from the second MLD, then the length (sometimes referred to herein as a "duration") of the immediate response frames may be dependent on, for example, an Acknowledgement (Ack) frame type (e.g., Ack frame or Block Ack (BA) frame), a BA bitmap size (e.g., 64-bit bitmap, 256-bit bitmap, 1024-bit bitmap, etc.), a Modulation and Coding Scheme (MCS) rate of the Ack frame which depends on the soliciting frame and basic rate of a BSS, etc. Therefore, although the transmission end times of the PPDUs which carry the frames on multiple links may be aligned, there is a possibility that the transmission end times of the PPDUs carrying the immediate response frames on the multiple links may be different, causing the NSTR MLD to be unable to operate properly.

In addition, when a STA transmits a series of frames to another STA in an Aggregated-MAC Protocol Data Unit (A-MPDU) frame format, if the number of frames aggregated in an A-MPDU becomes large, then the length of an acknowledgement frame transmitted in response to the A-MPDU also becomes large, in which case use of a non-High Throughput (non-HT) (duplicate) PPDU format to carry the Ack frame may take an extended amount airtime. To prevent extended airtime, the STA that transmits data frames may decide how the response frames may be carried. In some embodiments, a first STA may include a Trigger frame when the first STA transmits a frame that solicits an immediate response frame to determine a duration of the immediate response frame. However, conventional Trigger frames are restricted to certain frames, frame formats, e.g., Trigger-Based (TB) PPDUs in response to Trigger frames (except for Multi-User Request-to-Send (MU-RTS) Trigger frames and Clear-to-Send (CTS) frames in response to MU-RTS Trigger frames), and/or large frame sizes.

In some embodiments, an A-Control subfield (sometimes referred to herein as an "A-Control field") can be used when transmitting trigger information. Examples of trigger information may include a PPDU length, a PPDU format, transmission bandwidth of a PPDU, a Resource Unit (RU) allocation, AP transmission power, an UL Target Signal Strength Indicator (RSSI), an MCS, etc. Currently, a Triggered Response Scheduling (TRS) variant of the A-Control subfield triggers an immediate response frame using indications described herein. In some embodiments, a UL Data Symbols subfield indicates the number of Orthogonal Frequency-Division Multiplexing (OFDM) symbols in a Data field of a High-Efficiency (HE) TB PPDU response. In some embodiments, an RU Allocation subfield indicates an RU assigned for transmitting the HE TB PPDU response. In some embodiments, an AP Tx Power subfield indicates an AP's combined transmission power at the antenna connectors of each transmit antenna used to transmit a triggering PPDU. In some embodiments, a UL Target RSSI subfield indicates the expected receive power at the AP (e.g., averaged RSSI over each AP's antennas) for an HE portion of the HE TB PPDU transmitted on an assigned RU. In some embodiments, the UL HE-MCS subfield indicates an HE-MCS (in an HE-MCS range of zero to three) to be used by a receiving STA for the HE TB PPDU. However, the fields described are not needed when triggering a PPDU from a single STA. Therefore, triggering a PPDU from a single STA may be performed more efficiently to enable improved wireless communications.

In accordance with an embodiment of the invention, a technique for wireless communications may involve at a first STA, transmitting a first PPDU that includes a first frame to a second STA, wherein the first frame indicates a first duration of a second PPDU that is transmitted subsequent to the first PPDU by a single STA, wherein a non-TB PPDU format is used for the second PPDU, and wherein the first frame solicits a response frame included as part of the second PPDU, and at the first STA, receiving from the second STA, the second PPDU that includes the response frame. In some embodiments, the first STA and/or the second STA may be defined as a STA affiliated with a non-AP MLD, a STA affiliated with an AP MLD, and/or a STA operating on a link that may be within an NSTR link pair. In some embodiments, the first STA may be affiliated with a non-AP MLD operating on a link that may be within an NSTR link pair and the second STA may be affiliated with an AP MLD that may be an STR MLD. In some embodiments, the first STA may be affiliated with an AP MLD that may be an STR MLD and the second STA may be affiliated with a non-AP MLD that may be an NSTR MLD. In some embodiments, the first frame may explicitly indicate and/or implicitly indicate the first duration of the second PPDU. Thus, techniques described herein may enable components of wireless communication systems to signal trigger information using PPDUs which align transmission end times of response frames from a single wireless device. Aligning transmission end times allows wireless devices (e.g., NSTR MLDs) to support simultaneous frame transmission on multiple links (even on an NSTR link pair) and further enable wireless communications to be performed more efficiently.

An example of a PPDU that may be transmitted by a wireless device is described in further detail below with reference to FIG. 2.

Figure 2:
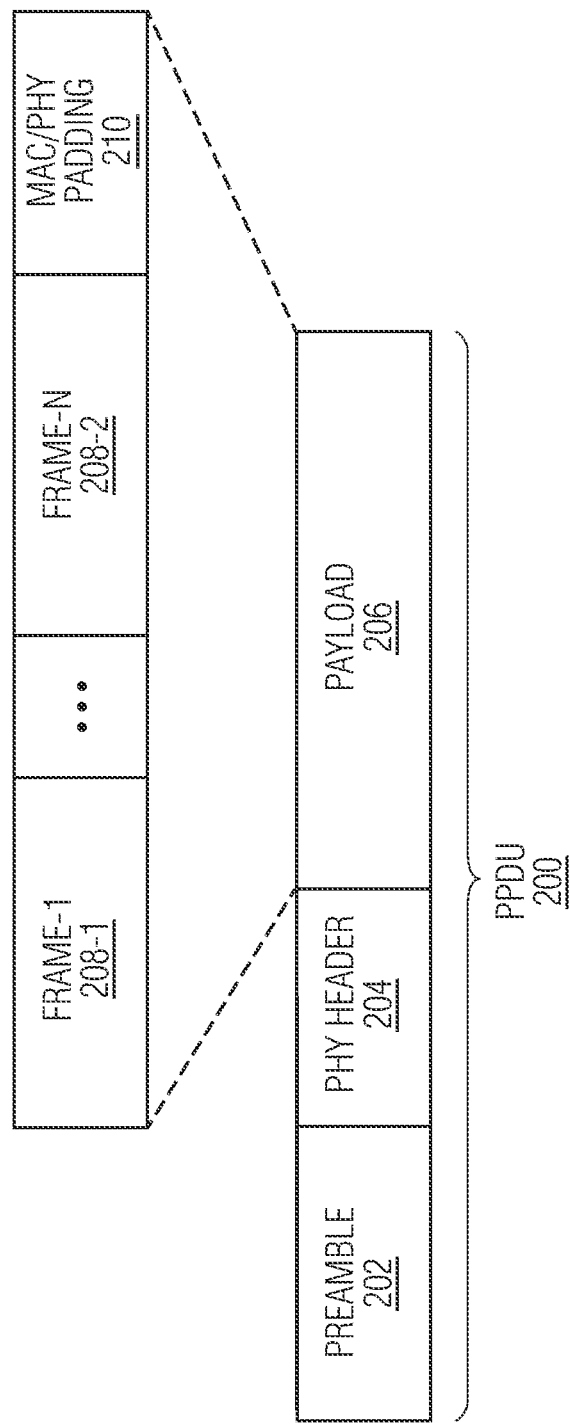
FIG. 2 depicts an example of a Physical Layer Protocol Data Unit (PPDU) that may be transmitted by a wireless device in accordance with an embodiment of the invention.

FIG. 2 depicts an example of a PPDU that may be transmitted by a wireless device in accordance with an embodiment of the invention. With reference to FIG. 2, the PPDU, implemented as PPDU 200, is shown as including three portions, implemented as a Preamble 202, a PHY Header 204, and a Payload 206. In particular, FIG. 2 shows the Payload 206 of the PPDU 200 as including multiple frames, implemented as a first frame, Frame-1 208-1, and a subsequent frame, Frame-N 208-2, followed by a MAC/PHY Padding frame, implemented as MAC/PHY Padding 210. In some embodiments, the PPDU 200 may be a first PPDU that includes a first frame (e.g., Frame-1 208-1) and may be transmitted by a first STA to a second STA. In some embodiments, Frame-1 208-1 of the PPDU 200 solicits a response frame (not shown) included as part of a second PPDU (not shown). In some embodiments, the first STA may then receive from the second STA, the second PPDU that includes the response frame.

In one embodiment, trigger information may be included in a MAC header portion of a first frame in a PPDU (e.g., PPDU 200). In another embodiment, trigger information may be included in a set of frames (e.g., each frame) in a PPDU (e.g., PPDU 200). In some embodiments, the MAC header portion of the first frame further includes a variant of an A-Control subfield that may be used to carry the trigger information. For example, modification of a conventional TRS Control variant of the A-Control subfield may be used to carry the trigger information. As another example, a new variant of the A-Control subfield may be defined to carry the trigger information. In some embodiments, the trigger information may include an indication of a single-STA response, such that the single-STA response implies that there may be one STA (e.g., a second STA) which may respond to a first PPDU transmitted by a first STA. In one embodiment, the first PPDU may be a Single-User (SU) PPDU in which an Receiver Address (RA) field of the first frame may be a unicast MAC address, such that the SU PPDU implies the single-STA response. For example, the SU PPDU implies that the first PPDU may be transmitted to a single target STA (e.g., a second STA). Examples of the SU PPDU include a non-HT (duplicate) PPDU, a High-Throughput (HT) PPDU, a Very High-Throughput (VHT) SU PPDU, an HE SU PPDU, an HE Extended Range (ER)-SU PPDU, etc. In another embodiment, a specific subfield in the (modified) TRS Control subfield of the A-Control subfield may be set to a predetermined value. For example, an RU Allocation subfield of the (modified) TRS Control subfield may be set to the predetermined value to indicate that the (modified) TRS Control subfield may be for a single STA trigger and/or used for the single-STA response. As another example, a Reserved bit (B25) of a baseline TRS Control subfield may be used to indicate the single STA trigger and/or the single-STA response.

In some embodiments, if the (modified) TRS Control variant of the A-Control subfield is used, then an exact length of a second PPDU may be indicated instead of indicating a number of OFDM symbols in a Data field of an HE TB PPDU response (because the second PPDU may not be the HE TB PPDU). As an example, the (modified) TRS Control variant of the A-Control subfield may be implemented via a single STA trigger that indicates a single-STA response. In one embodiment, the (modified) TRS Control variant of the A-Control subfield may indicate a value of a Legacy Signal (L-SIG) LENGTH field of the second PPDU.

In such an embodiment, the (modified) TRS Control variant of the A-Control subfield may be implemented via a conventional trigger that indicates a single-STA response. As an example, 12-bits may be allocated to indicate the value of the L-SIG Length field of the second PPDU. As another example, a conventional AP Tx Power subfield, UL Target RSSI subfield, and UL HE-MCS subfield may be used to indicate the L-SIG LENGTH field of the second PPDU.

Examples of a conventional trigger and a single STA trigger that may be used to indicate a duration of a PPDU for a single-STA response are described in further detail below with reference to FIG. 3.

Figure 3:
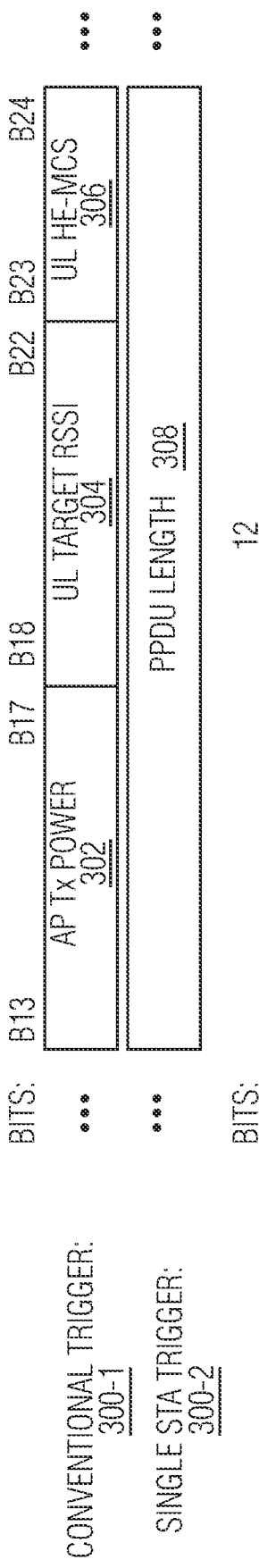
FIG. 3 depicts examples of a conventional trigger and a single station (STA) trigger that may be used to indicate a duration of a PPDU for a single-STA response in accordance with an embodiment of the invention.

FIG. 3 depicts examples of a conventional trigger and a single STA trigger that may be used to indicate a duration of a PPDU for a single-STA response in accordance with an embodiment of the invention. With reference to FIG. 3, the conventional trigger is implemented as conventional trigger 300-1 and the single STA trigger is implemented as single STA trigger 300-2. In particular, FIG. 3 shows the conventional trigger 300-1 as including three subfields, implemented as AP Tx Power 302 (includes bits B13 to B17), UL Target RSSI 304 (includes bits B18 to B22), and UL HE-MCS 306 (includes bits B23 to B24). In such an embodiment, the three subfields of the conventional trigger 300-1 may be included as part of a (modified) TRS Control variant of an A-Control subfield (not shown) in a first frame (e.g., Frame-1 208-1) of a first PPDU (e.g., PPDU 200) which indicates a value of an L-SIG LENGTH field of a second PPDU (not shown). In some embodiments, the conventional trigger 300-1 may be transmitted by a first STA (not shown) to a second STA (not shown) to indicate a length for the second PPDU, such that the second PPDU may be transmitted by the second STA (with the indicated length) to the first STA in response to the conventional trigger 300-1.

In addition, FIG. 3 shows the single STA trigger 300-2 as including one subfield, implemented as PPDU Length 308 (includes 12-bits). In such an embodiment, the PPDU Length 308 of the single STA trigger 300-2 may be included as part of the (modified) TRS Control variant of the A-Control subfield (not shown) in the first frame (e.g., Frame-1 208-1) of the first PPDU (e.g., PPDU 200) which indicates the value of the L-SIG LENGTH field of the second PPDU (not shown). In some embodiments, the single STA trigger 300-2 may be transmitted by the first STA (not shown) to the second STA (not shown) to indicate the length for the second PPDU, such that the second PPDU may be transmitted by the second STA (with the indicated length) to the first STA in response to the single STA trigger 300-2.

In some embodiments, trigger information included in a first frame of a first PPDU transmitted by a first STA to a second STA may also indicate a PPDU format for a second PPDU, such that the second PPDU is transmitted by the second STA (with the indicated format) to the first STA in response to reception of the first PPDU at the second STA. For example, the trigger information included in the first PPDU may indicate whether or not the second PPDU transmitted by the second STA will be a non-HT (duplicate) PPDU format. As another example, the trigger information included in the first PPDU may indicate a specific PPDU format such as, for example, a non-HT (duplicate) PPDU format, an HT PPDU format, a VHT PPDU format, an HE PPDU format, an EHT PPDU format, etc.

In some embodiments, trigger information included in a first frame of a first PPDU transmitted by a first STA to a second STA may also indicate an MCS level and/or a Number of Spatial Streams (Nss) and/or a data rate of a second PPDU, such that the second PPDU may be transmitted by the second STA (with the indicated MCS level and/or Nss and/or data rate) to the first STA in response to reception of the first PPDU at the second STA. For example, as a frame size of a response frame is given, the information of the MCS level and/or the Nss and/or the data rate of the second PPDU may be used to indicate a length of the second PPDU.

In some embodiments, trigger information included in a first frame of a first PPDU transmitted by a first STA to a second STA may also indicate a maximum MCS level and/or an Nss and/or a data rate of a second PPDU, such that the second PPDU may be transmitted by the second STA (with the indicated maximum MCS level and/or Nss and/or data rate) to the first STA in response to reception of the first PPDU at the second STA. As an example, the second STA may choose the maximum MCS level and/or the Nss and/or the data rate of the second PPDU as long as the maximum MCS level and/or the Nss and/or the data rate of the second PPDU are within indicated maximum allowed values.

In some embodiments, trigger information included in a first frame of a first PPDU transmitted by a first STA to a second STA may also include an indication that a response frame shall satisfy a conventional (or legacy) rule for rate selection of control response frames, such that the second PPDU (which includes the response frame) may be transmitted by the second STA (with the indicated conventional (or legacy) rule for rate selection of control response frames) to the first STA in response to reception of the first PPDU at the second STA. For example, such an indication may be 1-bit, and if the bit is set to a first state (e.g., "1"), then the response frame shall satisfy the conventional (or legacy) rule for rate selection of control response frames. As another example, if the bit is set to a second state (e.g., "0"), then the response frame may not need to satisfy the conventional (or legacy) rule for rate selection of control response frames. In one example, the bit may be set to the first state (e.g., "1"), if the second STA has not transmitted a (control response) frame that satisfies the conventional (or legacy) rule for rate selection of control response frames before transmitting the response frame during the first STA's transmission opportunity (TXOP). In another example, the bit may be set to the first state (e.g., "1"), if the second STA has not transmitted a legacy compatible PPDU before transmitting the response frame during the first STA's TXOP. In some embodiments, the indication that the response frame shall satisfy the conventional (or legacy) rule for rate selection of control response frames may also be used to indicate the length of the second PPDU, given the length of the second PPDU depends on the rate selection value.

In some embodiments, trigger information included in a first frame of a first PPDU transmitted by a first STA to a second STA may also include an indication of a transmission bandwidth of a second PPDU, such that the second PPDU (which includes the indicated transmission bandwidth) may be transmitted by the second STA to the first STA in response to reception of the first PPDU at the second STA. In some embodiments, the trigger information also includes an indication that the second STA may be allowed to aggregate another frame with a response frame included in the second PPDU. In such an embodiment, the other frame may be a data frame. In some embodiments, the trigger information may be carried in a MAC header portion of the first frame and includes an indication that a Carrier Sense (CS) may be required before the second STA transmits the second PPDU. As an example, if there is an indication that CS is required, then the second STA may consider a status of a Clear Channel Assessment (CCA) and a virtual CS during a predetermined time between the reception of the first PPDU and the transmission of the second PPDU. In some embodiments, the first STA may be a non-AP STA and the second STA may be an AP STA.

In some embodiments, trigger information on a length of a second PPDU may be a maximum allowable duration. In such an embodiment, a second STA may choose an MCS level and/or a data rate and/or an Nss and/or a PPDU format of the second PPDU as long as the length of the second PPDU is less than or equal to indicated trigger information on the length of the second PPDU. In some embodiments, a separate Trigger frame may be used to carry the trigger information, and the separate Trigger frame may be aggregated with other frame(s) in an A-MPDU. In such an embodiment, a PPDU that initiates a TXOP may be a PPDU format that is not a non-HT (duplicate) PPDU format (if the PPDU carries an A-MPDU), such that one A-MPDU subframe of the A-MPDU is a Trigger frame. Furthermore, in such an embodiment, the Trigger frame may carry the trigger information. In some embodiments, trigger information may further include an indication of whether or not a transmission bandwidth of a PPDU carrying the trigger information is 320 MHz or 160+160 MHz. In such an embodiment, the trigger information may also include channel puncturing information within the transmission bandwidth of the PPDU, such that channel puncturing information may indicate whether channels (or subchannels) included in a bandwidth are punctured or unpunctured.

In some embodiments, a variant of an A-Control subfield in a MAC header portion of a first frame of a first PPDU may be defined to include trigger information. In some embodiments, the trigger information may be denoted by a Single Response Scheduling (SRS) control variant of the A-Control subfield (sometimes referred to herein as an "SRS control subfield") in the MAC header portion of the first frame of the first PPDU. In one embodiment, the SRS control subfield includes a first indication that explicitly indicates a length of a second PPDU. For example, if the first indication is set to a first state (e.g., "0"), then SRS control subfield includes a second field that indicates the value of an L-SIG LENGTH field of the second PPDU. In addition, in such an example, if the first indication is set to a second state (e.g., "1"), then the SRS control subfield includes a third field that indicates an MCS level and/or a data rate and/or an Nss and/or a transmission bandwidth and/or a PPDU format of the second PPDU. In one embodiment, at least part of the second field and the third field share the same bit field.

Examples of an SRS control variant of an A-Control subfield that may denote trigger information are described in further detail below with reference to FIG. 4.

Figure 4:
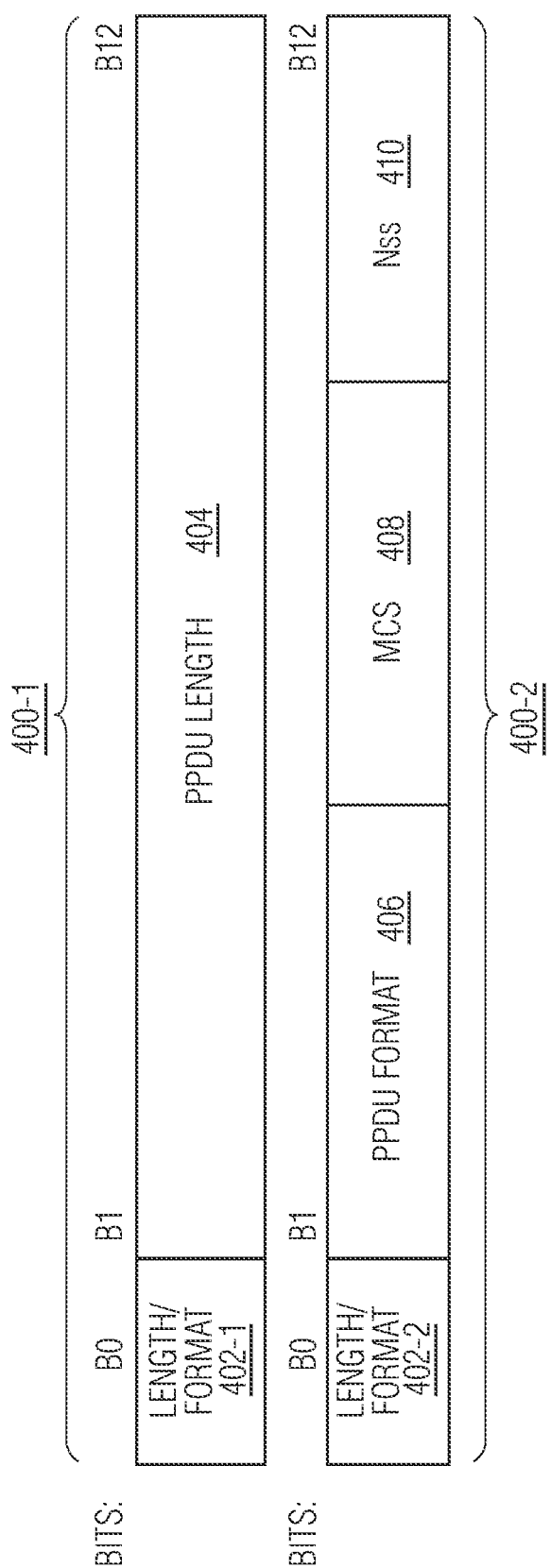
FIG. 4 depicts examples of a Single Response Scheduling (SRS) control variant of an A-Control subfield that may denote trigger information in accordance with an embodiment of the invention.

FIG. 4 depicts examples of an SRS control variant of an A-Control subfield that may denote trigger information in accordance with an embodiment of the invention. With reference to FIG. 4, the SRS control subfields are implemented as a first SRS control subfield 400-1 and a second subfield 400-2. In particular, FIG. 4 shows the first SRS control subfield 400-1 as including two fields, implemented as Length/Format 402-1 (which includes bit B0) and PPDU Length 404 (which includes bits B1 to B12). In such an embodiment, the two fields of the first SRS control subfield 400-1 may be included as part of an A-Control subfield (not shown) in a first frame (e.g., Frame-1 208-1) of a first PPDU (e.g., PPDU 200) which indicates a length of a second PPDU (not shown). In some embodiments, the first SRS control subfield 400-1 may be transmitted by a first STA (not shown) to a second STA (not shown) to indicate the length for the second PPDU, such that the second PPDU may be transmitted by the second STA (with the indicated length) to the first STA in response to the first SRS control subfield 400-1. In some embodiments, the first SRS control subfield 400-1 may be for a synchronous transmission to/from an NSTR non-AP MLD.

In addition, FIG. 4 shows the second SRS control subfield 400-2 as including four fields, implemented as Length/Format 402-2 (which includes bit B0), PPDU format 406, MCS 408, and Nss 410 (which are each included by bits B1 to B12). In such an embodiment, the four fields of the second SRS control subfield 400-2 may be included as part of an A-Control subfield (not shown) in the first frame (e.g., Frame-1 208-1) of the first PPDU (e.g., PPDU 200) which indicates the length of the second PPDU (not shown). In some embodiments, the second SRS control subfield 400-2 may be transmitted by the first STA (not shown) to the second STA (not shown) to indicate the length for the second PPDU, such that the second PPDU may be transmitted by the second STA (with the indicated length) to the first STA in response to the second SRS control subfield 400-2. In some embodiments, the second SRS control subfield 400-2 may be for an A-MPDU with a large aggregation level.

In some embodiments, when a first STA transmits a first PPDU to a second STA, where the first PPDU includes trigger information that indicates a duration of a PPDU carrying a response frame, the second STA may transmit a second PPDU in a Short Interframe Space (SIFS) time after successful reception of the first PPDU. In some embodiments, the trigger information may indicate that the response frame may need to be carried in an SU PPDU format such as, for example, an HE SU PPDU format and/or an EHT PPDU format (e.g., an EHT MU PPDU format addressed to a single STA). However, the second STA takes time to determine and construct a suitable PPDU (e.g., a second PPDU) format to carry the response frame with the duration indicated by the trigger information included in the first PPDU. Thus, if the required time for the second STA to determine and construct the suitable PPDU (e.g., the second PPDU) is longer than SIFS, then the second STA may not transmit the second PPDU and/or not satisfy the indicated duration of the PPDU.

To overcome the issue presented by the duration indication for a response frame when a first STA transmits a first PPDU to a second STA, the second STA may indicate information on a first time duration to the first STA. For example, when a first STA transmits a first PPDU to a second STA, such that the first PPDU includes a first information that indicates a duration of a PPDU (e.g., a second PPDU) carrying a response frame, the second STA may indicate information on a first time duration to the first STA. In some embodiments, the first time duration may be a gap that may be required to process the first information and construct the PPDU carrying the response frame according to the first information, such that the first information includes information on the duration of the PPDU (e.g., the second PPDU) carrying the response frame, and where a declaration (indication of the first time duration) occurs before the second STA receives the first information from the first STA. In some embodiments, when the first STA transmits the first PPDU carrying the first information to the second STA, the first STA may transmit the first PPDU such that a time difference between a reference point of the first PPDU and an ending time of the first PPDU is greater than or equal to the first time duration (e.g., a time value indicated by the second STA).

In some embodiments, an ending time of a PPDU (e.g., a first PPDU) may indicate the end of the PPDU before a PHY packet extension portion. In some embodiments, the ending time of the PPDU (e.g., the first PPDU) indicates the end of the PPDU including the PHY packet extension portion. In some embodiments, the ending time of the PPDU (e.g., a first PPDU) indicates the end of the PPDU including the PHY packet extension portion and an additional SIFS time. In some embodiments, the ending time of the PPDU (e.g., the first PPDU) indicates a start time of another PPDU (e.g., a second PPDU) that includes a response frame (e.g., an immediate response frame), such that the other PPDU (e.g., the second PPDU) is transmitted in response to the first PPDU.

Examples of PPDUs that include a first information in a MAC header portion of a frame and that have different reference points are described in further detail below with reference to FIGS. 5A-5C.

Figure 5A:
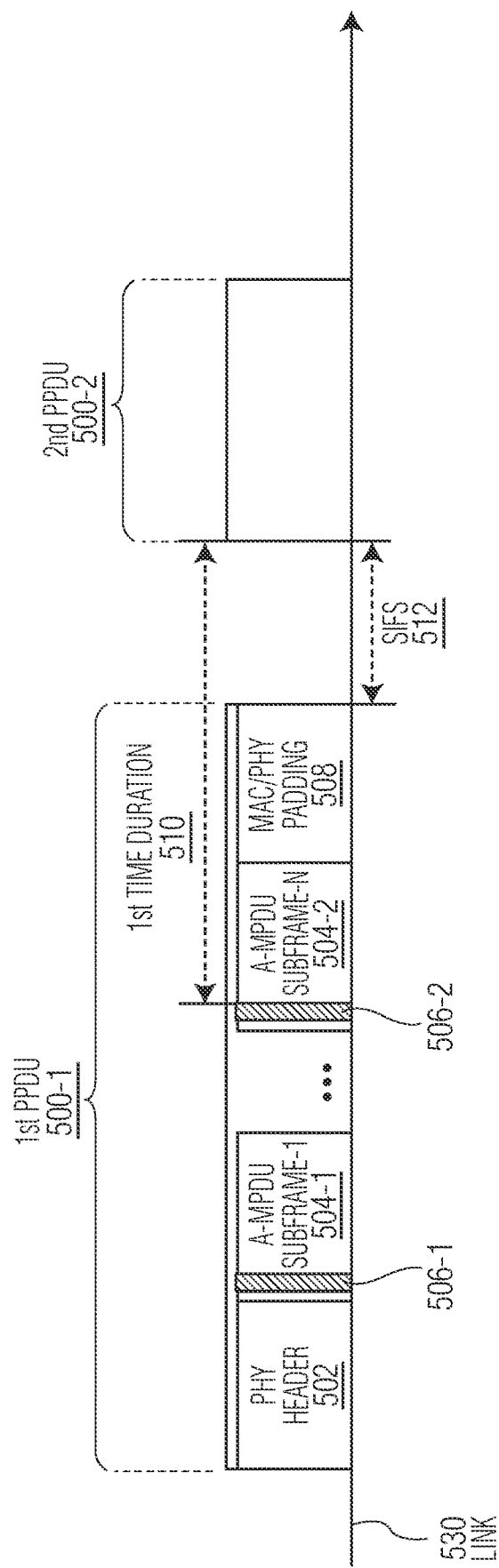
FIG. 5A illustrates an example of a PPDU that includes a first information indicating trigger information in accordance with an embodiment of the invention.

FIG. 5A illustrates an example of a PPDU that includes a first information indicating trigger information in accordance with an embodiment of the invention. With reference to FIG. 5A, a first PPDU and a second PPDU are transmitted on link 530 and are implemented as $1^{st}$ PPDU 500-1 and $2^{nd}$ PPDU 500-2, respectively. In particular, FIG. 5A shows the $1^{st}$ PPDU 500-1 as including four frames, implemented as PHY Header 502, A-MPDU Subframe-1 504-1 which includes a first subfield 506-1, A-MPDU Subframe-N 504-2 which includes an N subfield 506-2 (N is an integer greater than 1), and MAC/PHY Padding 508. In some embodiments, the first subfield 506-1, the N subfield 506-2, and other subfields (not shown) which may be included in the $1^{st}$ PPDU 500-1, include the first information in a MAC header portion (such as a variant of a control subfield in an A-Control subfield) of a data frame (e.g., A-MPDU Subframe-1 504-1 and/or A-MPDU Subframe-N 504-2) in the $1^{st}$ PPDU 500-1. In such an embodiment, the $1^{st}$ PPDU 500-1 may be transmitted by a first STA (not shown) to a second STA (not shown) to solicit a control response frame (not shown) included in the $2^{nd}$ PPDU 500-2 via the first information included in the first subfield 506-1, the N subfield 506-2, and/or other subfields (not shown) which may be included in the $1^{st}$ PPDU 500-1.

With reference to FIG. 5A, after the transmission of the $1^{st}$ PPDU 500-1 from the first STA to the second STA, the $2^{nd}$ PPDU 500-2 may be transmitted in SIFS time 512 after the end of the $1^{st}$ PPDU 500-1. In such an embodiment, prior to the reception of the $1^{st}$ PPDU 500-1, the second STA may indicate a first time duration (shown as $1^{st}$ time duration 510) to the first STA. In one embodiment, the first STA may generate MAC/PHY Padding 508 in the $1^{st}$ PPDU 500-1 such that a time difference between a reference point of the $1^{st}$ PPDU 500-1 and an ending time of the $1^{st}$ PPDU 500-1 may be greater than or equal to the first time duration 510. As an example, the reference point may be defined as the end of the first information in a MAC header portion (N subfield 506-2) and the ending time of the $1^{st}$ PPDU 500-1 may be defined as the start time of the $2^{nd}$ PPDU 500-2. In some embodiments, the $2^{nd}$ PPDU 500-2 may include a response frame solicited by the $1^{st}$ PPDU 500-1. In some embodiments, a duration between two adjacent PPDUs (e.g., SIFS time 512) may be predetermined, such that the $1^{st}$ time duration 510 can be defined using a value with or without including the duration between two adjacent PPDUs. For example, the $1^{st}$ time duration 510 shown in FIG. 5A is defined using a value that includes SIFS time 512.

Figure 5B:
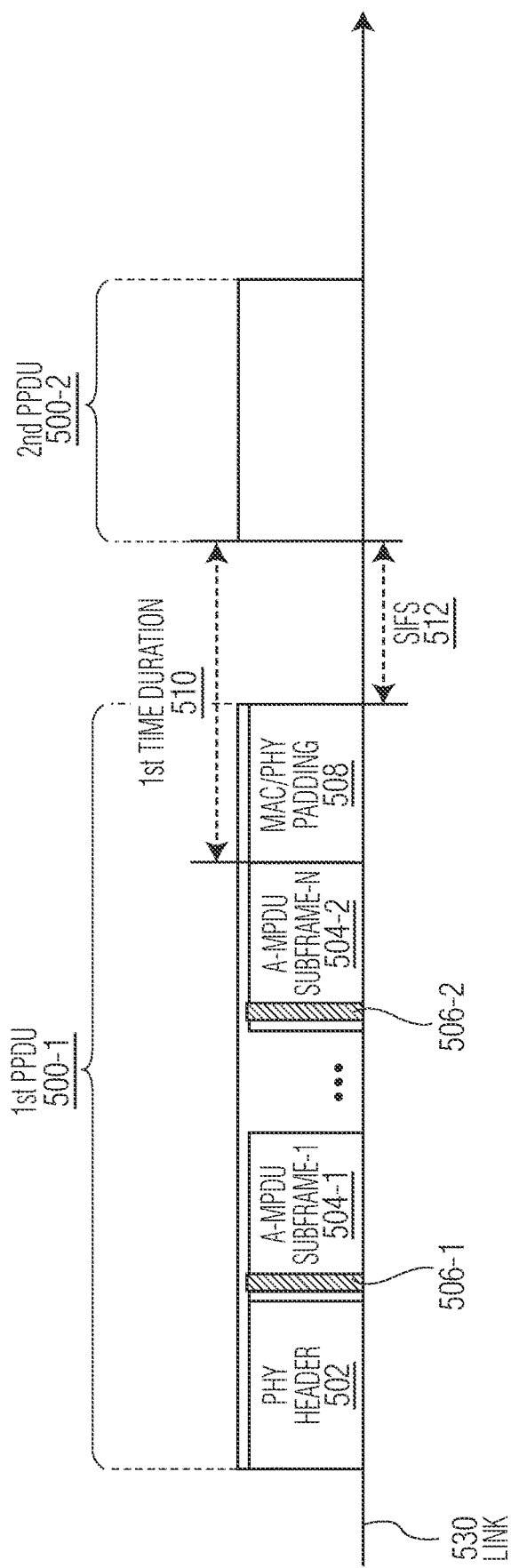
FIG. 5B illustrates another example of a PPDU that includes a first information indicating trigger information in accordance with an embodiment of the invention.

FIG. 5B illustrates another example of a PPDU that includes a first information indicating trigger information in accordance with an embodiment of the invention. With reference to FIG. 5B, a first PPDU and a second PPDU are transmitted on link 530 and are implemented as 1st PPDU 500-1 and 2nd PPDU 500-2, respectively. In particular, FIG. 5B shows the 1st PPDU 500-1 as including four frames, implemented as PHY Header 502, A-MPDU Subframe-1 504-1 which includes a first subfield 506-1, A-MPDU Subframe-N 504-2 which includes an N subfield 506-2 (N is an integer greater than 1), and MAC/PHY Padding 508. In some embodiments, the first subfield 506-1, the N subfield 506-2, and other subfields (not shown) which may be included in the 1st PPDU 500-1, include the first information in a MAC header portion (such as a variant of a control subfield in an A-Control subfield) of a data frame (e.g., A-MPDU Subframe-1 504-1 and/or A-MPDU Subframe-N 504-2) in the 1st PPDU 500-1. In such an embodiment, the 1st PPDU 500-1 may be transmitted by a first STA (not shown) to a second STA (not shown) to solicit a control response frame (not shown) included in the 2nd PPDU 500-2 via the first information included in the first subfield 506-1, the N subfield 506-2, and other subfields (not shown) which may be included in the 1st PPDU 500-1.

With reference to FIG. 5B, after the transmission of the 1st PPDU 500-1 from the first STA to the second STA, the 2nd PPDU 500-2 may be transmitted in SIFS time 512 after the end of the 1st PPDU 500-1. In such an embodiment, prior to the reception of the 1st PPDU 500-1, the second STA may indicate a first time duration (shown as 1st time duration 510) to the first STA. In one embodiment, the first STA may generate MAC/PHY Padding 508 in the 1st PPDU 500-1 such that a time difference between a reference point of the 1st PPDU 500-1 and an ending time of the 1st PPDU 500-1 may be greater than or equal to the first time duration 510. As an example, the reference point may be defined as the end of a frame that may not be a padding frame (e.g., A-MPDU Subframe-N 504-2) and the ending time of the 1st PPDU 500-1 may be defined as the start time of the 2nd PPDU 500-2. In some embodiments, the 2nd PPDU 500-2 may include a response frame solicited by the 1st PPDU 500-1. In some embodiments, a duration between two adjacent PPDUs (e.g., SIFS time 512) may be predetermined, such that the 1st time duration 510 can be defined using a value with or without including the duration between two adjacent PPDUs. For example, the 1st time duration 510 shown in FIG. 5B is defined using a value that includes SIFS time 512.

Figure 5C:
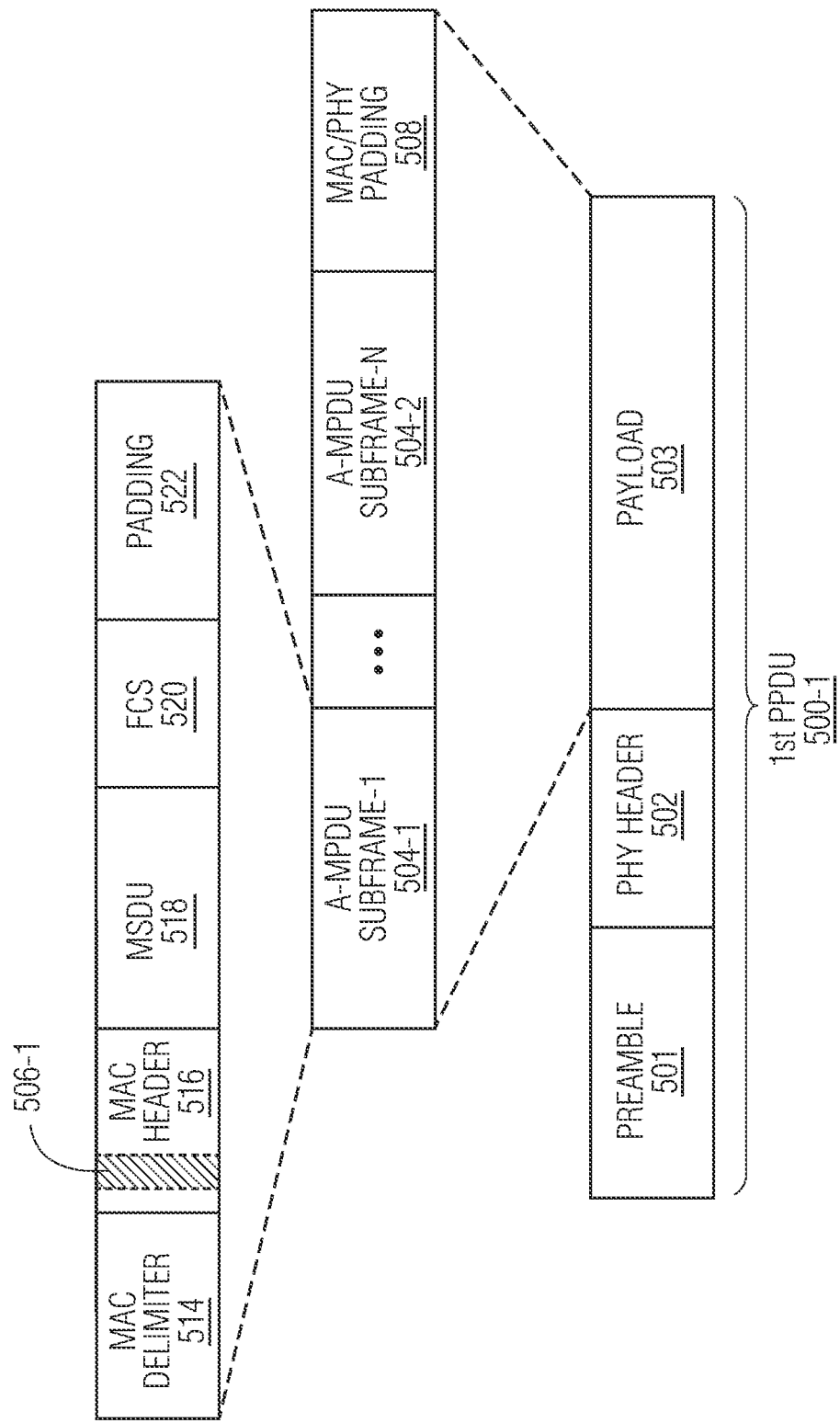
FIG. 5C depicts an example of a first PPDU that includes a first information indicating trigger information in accordance with an embodiment of the invention.

FIG. 5C depicts an example of a first PPDU that includes a first information indicating trigger information in accordance with an embodiment of the invention. With reference to FIG. 5C, the first PPDU (shown as 1st PPDU 500-1) may be implemented as the 1st PPDU 500-1 shown in FIG. 5A and/or FIG. 5B. In particular, FIG. 5C shows the 1st PPDU 500-1 as including three portions, implemented as Preamble 501, PHY Header 502, and Payload 503 which includes A-MPDU Subframe-1 504-1, A-MPDU Subframe-N 504-2, and MAC/PHY Padding 508. In some embodiments, A-MPDU Subframe-1 504-1 includes five portions, implemented as MAC Delimiter 504, MAC header 516 which includes a first subfield 506-1, MAC Service Data Unit (MSDU) 518, Frame Check Sequence (FCS) 520, and Padding 522. In some embodiments, A-MPDU Subframe-N 504-2 and/or other A-MPDU Subframes (not shown) may include the same or similar portions as those included in A-MPDU Subframe-1 504-1. In some embodiments, the first subfield 506-1 includes the first information that indicates a first duration and may be a variant of a control subfield in an A-Control subfield of the MAC Header 516. In such an embodiment, the 1st PPDU 500-1 may be transmitted by a first STA (not shown) to a second STA (not shown) to indicate the first duration via the first information included in the first subfield 506-1.

Examples of PPDUs that include a first information in a separate A-MPDU subframe and that have different reference points are described in further detail below with reference to FIGS. 6A-6B.

Figure 6A:
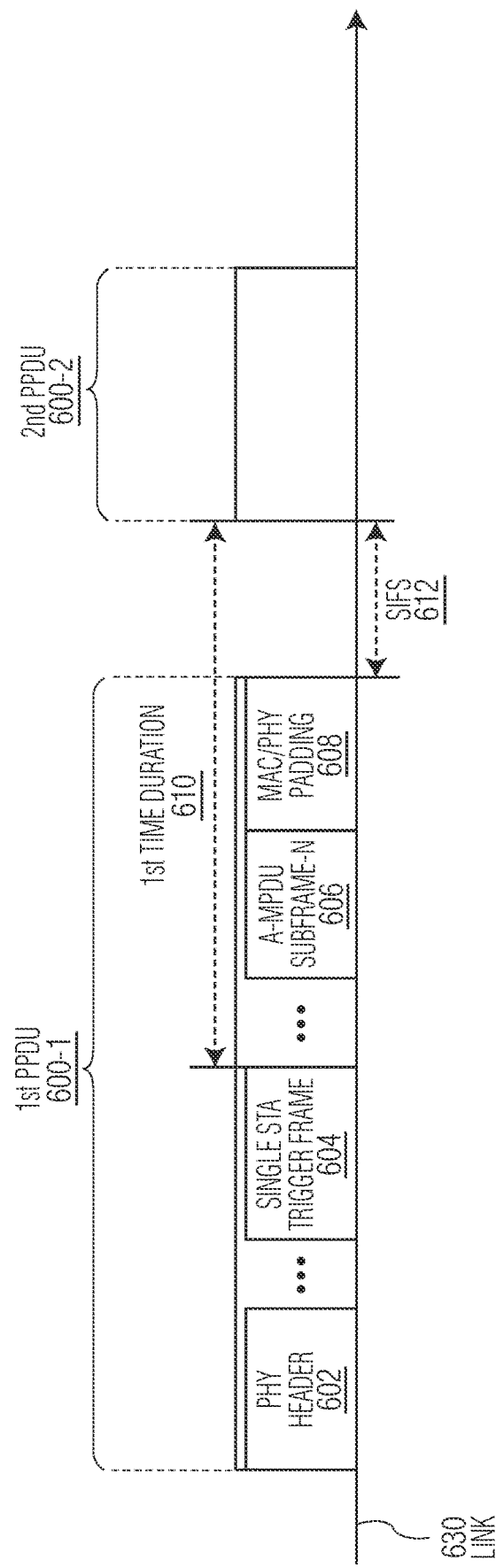
FIG. 6A illustrates another example of a PPDU that includes a first information indicating trigger information in accordance with an embodiment of the invention.

FIG. 6A illustrates another example of a PPDU that includes a first information indicating a trigger information in accordance with an embodiment of the invention. With reference to FIG. 6A, a first PPDU and a second PPDU are transmitted on link 630 and are implemented as 1st PPDU 600-1 and 2nd PPDU 600-2, respectively. In particular, FIG. 6A shows the 1st PPDU 600-1 as including four frames, implemented as PHY Header 602, Single STA Trigger frame 604, A-MPDU Subframe-N 606, and MAC/PHY Padding 608. In such an embodiment, the first information may be included as a separate A-MPDU subframe (such as a variant of a (modified) Trigger frame or a newly defined frame for a single STA trigger, e.g., Single STA Trigger frame 604) in the 1st PPDU 600-1. In such an embodiment, the 1st PPDU 600-1 may be transmitted by a first STA (not shown) to a second STA (not shown) to solicit a control response frame (not shown) included in the 2nd PPDU 600-2 via the Single STA Trigger frame 604.

With reference to FIG. 6A, after the transmission of the 1st PPDU 600-1 from the first STA to the second STA, the 2nd PPDU 600-2 may be transmitted in SIFS time 612 after the end of the 1st PPDU 600-1. In such an embodiment, prior to the reception of the 1st PPDU 600-1, the second STA may indicate a first time duration (shown as 1st time duration 610) to the first STA. In one embodiment, the first STA may generate MAC/PHY Padding 608 in the 1st PPDU 600-1 such that a time difference between a reference point of the 1st PPDU 600-1 and an ending time of the 1st PPDU 600-1 may be greater than or equal to the first time duration 610. As an example, the reference point may be defined as the end of a frame that includes the first information (e.g., Single STA Trigger frame 604) and the ending time of the 1st PPDU 600-1 may be defined as the start time of the 2nd PPDU 600-2. In some embodiments, the 2nd PPDU 600-2 may include a response frame solicited by the 1st PPDU 600-1. In some embodiments, a duration between two adjacent PPDUs (e.g., SIFS time 612) may be predetermined, such that the 1st time duration 610 can be defined using a value with or without including the duration between two adjacent PPDUs. For example, the 1st time duration 610 shown in FIG. 6A is defined using a value that includes SIFS time 612.

Figure 6B:
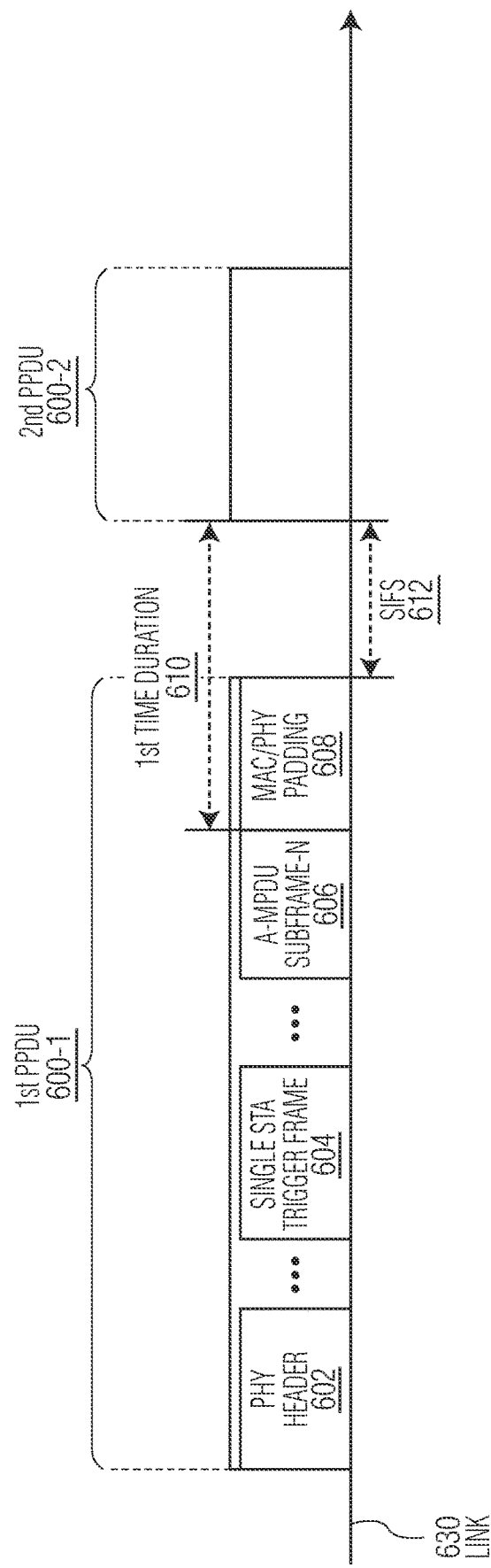
FIG. 6B illustrates another example of a PPDU that includes a first information indicating trigger information in accordance with an embodiment of the invention.

FIG. 6B illustrates another example of a PPDU that includes a first information indicating trigger information in accordance with an embodiment of the invention. With reference to FIG. 6B, a first PPDU and a second PPDU are transmitted on link 630 and are implemented as 1st PPDU 600-1 and 2nd PPDU 600-2, respectively. In particular, FIG. 6B shows the 1st PPDU 600-1 as including four frames, implemented as PHY Header 602, Single STA Trigger frame 604, A-MPDU Subframe-N 606, and MAC/PHY Padding 608. In such an embodiment, the first information may be included as a separate A-MPDU subframe (such as a variant of a (modified) Trigger frame or a newly defined frame for a single STA trigger, e.g., Single STA Trigger frame 604) in the 1st PPDU 600-1. In such an embodiment, the 1st PPDU 600-1 may be transmitted by a first STA (not shown) to a second STA (not shown) to solicit a control response frame (not shown) included in the 2nd PPDU 600-2 via the Single STA Trigger frame 604.

With reference to FIG. 6B, after the transmission of the 1$^{st}$ PPDU 600-1 from the first STA to the second STA, the 2$^{nd}$ PPDU 600-2 may be transmitted in SIFS time 612 after the end of the 1$^{st}$ PPDU 600-1. In such an embodiment, prior to the reception of the 1$^{st}$ PPDU 600-1, the second STA may indicate a first time duration (shown as 1$^{st}$ time duration 610) to the first STA. In one embodiment, the first STA may generate MAC/PHY Padding 608 in the 1$^{st}$ PPDU 600-1 such that a time difference between a reference point of the 1$^{st}$ PPDU 600-1 and an ending time of the 1$^{st}$ PPDU 600-1 may be greater than or equal to the first time duration 610. As an example, the reference point may be defined as the end of a frame that may not be a padding frame (e.g., A-MPDU Subframe-N 606) and the ending time of the 1$^{st}$ PPDU 600-1 may be defined as the start time of the 2$^{nd}$ PPDU 600-2. In some embodiments, the 2$^{nd}$ PPDU 600-2 may include a response frame solicited by the 1$^{st}$ PPDU 600-1. In some embodiments, a duration between two adjacent PPDUs (e.g., SIFS time 612) may be predetermined, such that the 1$^{st}$ time duration 610 can be defined using a value with or without including the duration between two adjacent PPDUs. For example, the 1$^{st}$ time duration 610 shown in FIG. 6B is defined using a value that includes SIFS time 612.

In some embodiments, when a first STA transmits a first PPDU (that includes a first information) to a second STA, if the first STA cannot make a first time duration with a difference greater than or equal to a first time, then the first information may imply a default value or multiple default values. In one embodiment, the first information may be set to the default value(s) and may be indicated to the second STA. In another embodiment, the first information may be set to the default value(s) and may be indicated to the first STA. In one embodiment, the second STA may not consider the first information when determining a PPDU format of a second PPDU, in which the second STA determines the PPDU format of the second PPDU based on the default value(s). In such an embodiment, the default value(s) may be used when the first PPDU uses a non-HT (duplicate) PPDU format.

In some embodiments, when the first PPDU uses the non-HT (duplicate) format, the first information may imply the default value(s). In one embodiment, the first information may be set to the default value(s) and may be indicated to the second STA. In another embodiment, the first information may be set to the default value(s) and may be indicated to the first STA. In such an embodiment, the second STA may not consider the first information when determining the PPDU format of the second PPDU, in which the second STA determines the PPDU format of the second PPDU based on the default value(s).

In some embodiments, instead of the second STA indicating information on the first time duration to the first STA, the first STA indicates information on the first time duration to the second STA. In some embodiments, the information on the first time duration of the second STA may be indicated to the first STA as one of the second STA's capabilities. In some embodiments, the first information may further indicate that an immediate response to the first PPDU may be carried in a SU PPDU format.

In some embodiments, a first STA transmits a first PPDU to a second STA, such that the first PPDU includes trigger information that indicates a duration of a PPDU that includes a response frame (e.g., an immediate response frame). In such an embodiment, the second STA may transmit a second PPDU SIFS time after successful reception of the first PPDU, such that the second PPDU's duration corresponds to the trigger information. However, because the second STA may determine a PPDU format, the PPDU format used for the second PPDU may not align with the PPDU format included in the trigger information. For example, the second STA may determine to use an HE PPDU format with a 13.6 μs duration for the second PPDU. But, in such an example, if the trigger information indicates the duration of the second PPDU to be 120 μs, then the second STA cannot transmit the PPDU with the 120 μs duration.

To overcome the issue presented by differences in PPDU formats and/or PPDU durations, trigger information may implement a threshold value. For example, when a first STA transmits a first PPDU to a second STA, such that the first PPDU includes trigger information that indicates a duration of a PPDU that includes a response frame (e.g., an immediate response frame), the second STA may transmit a second PPDU as an immediate response to the reception of the first PPDU, such that a difference between a duration of the second PPDU and a duration of a PPDU indicated by the trigger information may be less than a threshold value.

In one embodiment, the first STA may indicate the threshold value to the second STA before the first STA transmits the first PPDU. In another embodiment, the second STA may indicate the threshold value to the first STA before the first STA transmits the first PPDU. In some embodiments, the threshold value may be a predetermined value (i.e., specified by the IEEE 802.11 standard).

In some embodiments, a duration of the second PPDU (D1) shall be smaller than or equal to a duration of the PPDU indicated by the trigger information (D2). In such an embodiment, if the threshold value is defined as D2-D1, then the threshold value may be a non-negative number. In addition, in such an embodiment, the threshold value can be extended to D1, which implies that D2 indicates a maximum allowed PPDU duration for the second PPDU. In some embodiments, the duration of the second PPDU (D1) shall be greater than or equal to the duration of the PPDU indicated by the trigger information (D2). In such an embodiment, if the threshold value is be defined as D1-D2, then the threshold value has to be a non-negative number. In some embodiments, if the duration of the second PPDU is greater than the duration of the PPDU indicated by the trigger information, then the difference between the duration (e.g., actual duration) of the second PPDU and the duration of the PPDU indicated by the trigger information may be less than the threshold value. But, in such an embodiment, if the duration of the second PPDU is smaller than the duration of the PPDU indicated by the trigger information, then the difference between the duration of the second PPDU and the duration of the PPDU indicated by the trigger information may be less than a second threshold value. In some embodiments, the trigger information may further indicate that an immediate response to the first PPDU may be carried in a SU PPDU format.

In some embodiments, a second STA may be affiliated with a first MLD operating on a first link (e.g., link1) and a third STA may be affiliated with the first MLD operating on a second link (e.g., link2), such that the first MLD may be an NSTR MLD, and such that the third STA receives a third PPDU when the second STA receives a first PPDU. In such an embodiment, the third PPDU may solicit an immediate response. In such an embodiment, a threshold value included in trigger information may be smaller than SIFS or SIFS/2. In one embodiment, a duration of a second PPDU shall be smaller than or equal to a duration of a PPDU indicated by the trigger information (and the threshold value may be smaller than SIFS). In one embodiment, the third STA transmits a fourth PPDU as the immediate response to the reception of the third PPDU, such that a duration of the fourth PPDU may be predetermined, and such that the threshold value may be smaller than SIFS. In another embodiment, the third STA transmits the fourth PPDU as the immediate response to the reception of the third PPDU, such that the third PPDU includes a second trigger information that indicates the duration of the fourth PPDU, and such that the threshold value may be smaller than SIFS/2. In another embodiment, the third PPDU may be transmitted by a fourth STA, such that a first STA and the fourth STA may be affiliated with a second MLD. In such an embodiment, the second MLD may transmit a first PPDU and the third PPDU, such that a difference between a transmission end time of the first PPDU and a transmission end time of the third PPDU may be less than the second threshold value, and such that the second threshold value may be larger than or equal to the threshold value.

In some embodiments, a first STA transmits a first PPDU to a second STA, such that the first PPDU includes trigger information that indicates a duration of a PPDU carrying an immediate response frame. In such an embodiment, if the trigger information is included as a separate A-MPDU subframe (e.g., a first frame) within the first PPDU, and if the second STA does not receive the first frame correctly, then the second STA may use an Ack Policy included in another A-MPDU subframe (e.g., a second frame) within the first PPDU and may not consider the trigger information. In addition, in such an embodiment, if the Ack Policy in the second frame is set to Normal Ack or Implicit Block Ack Request (BAR), then the second STA may transmit a second PPDU as an immediate response without considering the trigger information. Consequently, in such an embodiment, the length of the second PPDU may be different from the duration of the PPDU indicated by the trigger information.

To overcome the issue presented by differences in PPDU durations, an Ack Policy of one or more Quality of Service (QoS) data frames included in a first PPDU may be set to a first state. For example, when a first STA transmits a first PPDU to a second STA, such that the first PPDU includes a first frame with trigger information that indicates a duration of a PPDU that includes an immediate response frame (or response frame), the Ack Policy of at least one QoS data frame included in the first PPDU may be set to the first state. In one embodiment, when the second STA receives the first PPDU and successfully receives at least one QoS data frame included in the first PPDU, and such that the second STA does not successfully receive a first frame (e.g., a first MPDU frame), then the second STA may not respond by transmitting the immediate response frame (e.g., a response frame). In another embodiment, when the second STA receives the first PPDU and successfully receives at least one QoS data frame included in the first PPDU, and such that the second STA does not receive the first frame successfully, then the second STA may send back the immediate response frame (e.g., the response frame), such that a duration of a PPDU that includes the immediate response frame may be no longer than a predetermined value. Examples of the predetermined value may include SIFS/2, ±SIFS/4, etc.

In some embodiments, an Ack Policy of one or more QoS data frames included in a first PPDU may be set to a first state, such that the first state involves Bit 5 (B5) and Bit 6 (B6) of a QoS Control field being set to "0" and "1", respectively. In some embodiments, a second STA may be affiliated with a first MLD operating on a first link (e.g., link1) and a third STA may be affiliated with the first MLD operating on a second link (e.g., link2), such that the first MLD may be an NSTR MLD, and such that the third STA receives a third PPDU when the second STA receives a first PPDU. In such an embodiment, the third PPDU may solicit an immediate response. In some embodiments, when the second STA receives a first PPDU and successfully receives at least one QoS data frame included in the first PPDU, and such that the second STA does not successfully receive a first frame, then the second STA may transmit an immediate response frame (e.g., a response frame), such that a duration of a PPDU that includes the immediate response frame may be no longer than a predetermined value. In one embodiment, the first STA may indicate the predetermined value to the second STA before the first STA transmits the first PPDU. In another embodiment, the first PPDU solicits the immediate response from the second STA via a single-STA response. In another embodiment, the trigger information further indicates that the immediate response frame to the first PPDU may be carried in a SU PPDU format.

In some embodiments, a first STA transmits a first PPDU to a second STA, such that the first PPDU includes trigger information that indicates a duration of a PPDU that includes an immediate response frame. In such an embodiment, if the actual size of the immediate response frame is smaller than a required size that can fill a responding PPDU (e.g., the PPDU that includes the immediate response frame) (with the indicated duration), then the second STA may not know how to choose different combinations of MCS, data rate, and PPDU format. In addition, because the second STA has limited time for processing, the second STA may not complete the construction of the responding PPDU in time for the solicited response.

To overcome the issue presented by the second STA's response difficulties, an MLD may define a reference rate and/or a reference format for the responding PPDU if trigger information is not present in the first PPDU. As an example, when the first STA transmits the first PPDU to the second STA, such that the first PPDU solicits a second PPDU (e.g., responding PPDU) that includes an immediate response frame, and such that trigger information is not present in the first PPDU, then a reference rate and/or a reference format may be defined. In some embodiments, the reference rate may be an MCS and/or a data rate that the second PPDU may use if the trigger information is not present in the first PPDU. In some embodiments, the reference format may be a PPDU format that the second PPDU may use if the trigger information is not present in the first PPDU. In some embodiments, the reference rate and/or the reference format may be limited to when the second PPDU includes a control response frame.

In some embodiments, there may be no restrictions to the reference rate and/or the reference format selection. As an example, the second STA can choose an HE/EHT PPDU format for the second PPDU. In such an example, the second STA can also choose an MCS and/or a data rate for the second PPDU as long as the MCS and/or the data rate for the second PPDU is not higher than the MCS and/or the data rate of the first PPDU. In another example, the second STA can choose a PPDU format that is not the reference format if the first PPDU includes trigger information. In such an example, the reference format may be a non-HT (duplicate) PPDU format. In addition, in such an embodiment, an allowed PPDU format for the second PPDU may be limited to a specific PPDU format such as, for example, an HT PPDU format and/or a VHT PPDU format and or an HE PPDU format and/or an EHT PPDU format.

In some embodiments, the second PPDU may use a lower MCS and/or a lower data rate than the reference rate and/or the reference format selection. As an example, if a PPDU length of the second PPDU can satisfy an indicated duration of the second PPDU by having a first rate for the second PPDU that is lower than the reference rate, then the second PPDU may use the first rate. In one embodiment, when the second PPDU uses the first rate, the format of the second PPDU may be the reference format (e.g., non-HT (duplicate) format).

In some embodiments, the second PPDU may use a higher MCS and/or a higher data rate than the reference rate and/or the reference format selection. As an example, if a PPDU length of the second PPDU can satisfy an indicated duration of the second PPDU by using a first rate for the second PPDU that is higher than the reference rate, then the second PPDU may use the first rate. In one embodiment, when the second PPDU uses the first rate, the format of the second PPDU may be the reference format (e.g., non-HT (duplicate) format). In one embodiment, the first rate may be equal to or lower than the data rate of the first PPDU.

In some embodiments, the second PPDU may use a different PPDU format than the reference format. As an example, if a PPDU length of the second PPDU cannot satisfy an indicated duration of the second PPDU using the reference format, then the second PPDU may use a PPDU format that may not be the reference format. As another example, if the PPDU length of the second PPDU can satisfy the indicated duration of the second PPDU using the reference format and by using a rate that is not the reference rate, then the second PPDU may use the reference format (e.g., non-HT (duplicate) format). In such an example, an allowed PPDU format for the second PPDU may be limited to a specific PPDU format such as, e.g., an HT PPDU format and/or a VHT PPDU format and/or an HE PPDU format and/or an EHT PPDU format.

The second PPDU using a different PPDU format than the reference format may also involve several other examples. In one example, if the PPDU length of the second PPDU cannot satisfy the indicated duration of the second PPDU by using a first rate for the second PPDU that may be higher than the reference rate, then the second PPDU may use a PPDU format that may not be the reference format (e.g., non-HT (duplicate) format). In such an example, the first rate may be equal to or lower than the data rate of the first PPDU and the allowed PPDU format for the second PPDU may be limited to a specific PPDU format such as, e.g., an HT PPDU format and/or a VHT PPDU format and/or an HE PPDU format and/or an EHT PPDU format. In another example, if the PPDU length of the second PPDU cannot satisfy the indicated duration of the second PPDU by using a first rate for the second PPDU that may be lower than the reference rate, then the second PPDU may use a PPDU format that may not be the reference format (e.g., non-HT (duplicate) format). In such an example, the allowed PPDU format for the second PPDU may be limited to a specific PPDU format such as, e.g., an HT PPDU format and/or a VHT PPDU format and/or an HE PPDU format and/or an EHT PPDU format.

In some embodiments, the second PPDU may use a different PPDU format when the reference rate cannot. As an example, if a PPDU length of the second PPDU cannot satisfy an indicated duration of the second PPDU with the reference format and the reference rate, then the second PPDU may use a PPDU format that may not be the reference format (e.g., non-HT (duplicate) format). In such an example, an allowed PPDU format for the second PPDU may be limited to a specific PPDU format such as, e.g., an HT PPDU format and/or a VHT PPDU format and/or an HE PPDU format and/or an EHT PPDU format.

In some embodiments, a first STA may transmit a first PPDU to a second STA, such that the first PPDU includes a first frame with trigger information that indicates the duration of a responding PPDU (e.g., a second PPDU) that includes an immediate response frame. In such an embodiment, the second STA may identify that the trigger information may be set to a first value and the second STA may transmit the second PPDU as an immediate response to the reception of the first PPDU, such that the second STA determines the duration of the second PPDU. In one embodiment, the first STA may be a TXOP owner and the second PPDU may not solicit an immediate response. In addition, in such an embodiment, the duration of the second PPDU may be determined such that the end time of the second PPDU may be within a TXOP of the first STA. In another embodiment, the first STA may be the TXOP owner and the second PPDU may solicit an immediate response. In addition, in such an embodiment, the duration of the second PPDU may be determined such that the end time of the second PPDU, an expected duration of a PPDU for the immediate response to the second PPDU, and SIFS may each be within a TXOP of the first STA. In one embodiment, the first value may be zero. In another embodiment, the first value may be a maximum value that the first value can indicate (e.g., an integer greater than zero).

In some embodiments, when an MCS of the second PPDU is compared with an MCS of the first PPDU, a predetermined gap of MCS difference may be further considered by default. For example, if a predetermined MCS gap that is to be applied to a PPDU carrying a control response frame is declared between the first STA and the second STA before the transmission of the first PPDU, then when the MCS of the second PPDU is compared with the MCS of the first PPDU, the predetermined MCS gap may be implicitly considered. As an example, the predetermined MCS gap may be (MCS of the first PPDU-MCS of the second PPDU=X), such that X may be 2. As another example, the predetermined MCS gap may correspond to a Signal-to-Noise (SNR) difference of X dB, such that X may be 1.

In some embodiments, if trigger information is included in a separate A-MPDU subframe (e.g., a Trigger frame), and if an NSTR non-AP MLD fails to decode the A-MPDU subframe, then the NSTR non-AP MLD cannot identify the length of a PPDU (e.g., a second PPDU) that includes an immediate response frame. To overcome failed decoding at the NSTR non-AP MLD, an AP MLD may indicate that the AP MLD may be capable of aligning transmission end times of down-link (DL) PPDUs (e.g., first PPDU and another PPDU) that are transmitted simultaneously on multiple links (e.g., link1 and link2) to STAs affiliated with the NSTR non-AP MLD, and up-link (UL) PPDUs (e.g., second PPDU and another PPDU different from the DL PPDUs) that are subsequently scheduled simultaneously on multiple links from the STAs.

In some embodiments, if the AP MLD indicates a capability of the AP MLD, then the AP MLD may include trigger information in a DL PPDU when the AP MLD transmits DL PPDUs simultaneously on multiple links to the same NSTR non-AP MLD. In one embodiment, the AP MLD may include the trigger information in each of the DL PPDUs when the AP MLD transmits DL PPDUs simultaneously on multiple links to the same NSTR non-AP MLD. In another embodiment, the AP MLD may include the trigger information in a subset of the DL PPDUs when the AP MLD transmits the DL PPDUs simultaneously on multiple links to the NSTR non-AP MLD.

In some embodiments, if the AP MLD indicates a capability of the AP MLD, then the AP MLD may align the transmission end time of UL PPDUs (e.g., UL immediate response PPDUs) from STAs affiliated with the NSTR non-AP MLD if the AP MLD intends to continue DL transmissions after receiving the UL PPDUs. In one embodiment, the AP MLD may indicate a first indication in the DL PPDUs that the AP MLD intends to continue DL transmission after reception of the UL immediate response PPDUs. In another embodiment, the AP MLD may indicate the first indication in a MAC header portion of the DL PPDUs.

In some embodiments, an AP MLD may advertise that the AP MLD may be capable of aligning the end of DL PPDUs (from a first STA and/or a third STA) that are transmitted simultaneously on multiple links to a same NSTR non-AP MLD. In such an embodiment, the AP MLD may align the transmission end times of immediate response frames that the DL PPDUs solicit simultaneously on multiple links to the same NSTR non-AP MLD if the AP MLD intends to continue DL transmission to the same NSTR non-AP MLD on multiple links simultaneously after the reception of the immediate response frames (from a second STA and/or a fourth STA). In addition, in such an embodiment, DL PPDUs transmitted after receiving the UL PPDUs (from the second STA and/or the fourth STA) avoid overlap with subsequent UL PPDUs. In one embodiment, the transmission end time of the immediate response frames may be aligned within a predetermined margin. Examples of the predetermined margin may include SIFS/2 and/or SIFS/4, such that SIFS may imply a 16 µs value or "aSIFTime+aSignalExtension" values as specified according to the IEEE 802.11 communication protocol.

In some embodiments, an NSTR MLD (with a first STA and a third STA) may receive PPDUs that are sent to the NSTR MLD on multiple links (such that the transmission end times of the PPDUs are aligned and solicit immediate response frames on the multiple links. In such an embodiment, if the NSTR MLD received trigger information on a first set of links within the multiple links successfully, but the NSTR MLD does not receive the trigger information on a second set of links within the multiple links, then the NSTR MLD may determine a transmission duration for the immediate response frames on the second set of links based on the trigger information from the first set of links.

In some embodiments, when a first MLD (with a first STA and a third STA) transmits PPDUs to an NSTR MLD (e.g., a second MLD) (with a second STA and a fourth STA), the first MLD may include trigger information in PPDUs on a third set of links within multiple links but may not include trigger information in PPDUs on a fourth set of links within the multiple links. In such an embodiment, a first set of links may be a subset of the third set of links and the fourth set of links may be a subset of a second set of links. In one embodiment, there may be one link included in the third set of links. In some embodiments, if the NSTR MLD cannot generate an immediate response frame on the second set of links using a non-HT (duplicate) PPDU format that satisfies a transmission duration indicated by the trigger information, then the NSTR MLD may generate the immediate response frame on the second set of links using a PPDU format that may not be the non-HT (duplicate) PPDU format (e.g., an HE PPDU format and/or an EHT PPDU format).

In some embodiments, an NSTR MLD may indicate a first time duration needed for the NSTR MLD to prepare for an immediate response frame on a link based on trigger information from another link. In one embodiment, the first time may be defined as the duration of a PPDU that may be after an OFDM symbol containing the last coded bit of a Low-Density Parity-Check (LDPC) codeword that may encode the last bit of a Service Channel (SCH) minus T_{PE, nominal}, such that SCH represents either (i) a User Info field addressed to the NSTR MLD of a last (or single) Trigger frame, or (ii) a last A-Control subfield that may correspond to the trigger information in a Physical Layer Convergence Procedure (PLCP) Service Data Unit (PSDU), such that T_{PE, nominal} may be a given packet extension (PE) value of the PPDU.

In another embodiment, the first time may be a sum of a first subfield value and a second subfield value, such that the first subfield value may indicate the time required to prepare an immediate response frame (based on trigger information on the same link), and such that the second subfield value may indicate the time required to identify trigger information from another link. In such an embodiment, the first subfield value may be included in a first subfield and the second subfield value may be included in a second subfield, such that the first subfield may be a Trigger Frame MAC Padding Duration subfield value of an HE/EHT Capability element. In such an embodiment, the first subfield value may imply an inter-link communication delay for the NSTR MLD.

In another embodiment, the first time may be a maximum of a first subfield value and a second subfield value, such that the first subfield value may indicate the time required to prepare the immediate response frame (based on trigger information on the same link), and such that the second subfield value may indicate the time required to identify trigger information from another link. In such an embodiment, the first subfield value may be included in a first subfield and the second subfield value may be included in a second subfield, such that the first subfield may be a Trigger Frame MAC Padding Duration subfield value of an HE/EHT Capability element. In such an embodiment, the first subfield value may imply an inter-link communication delay for the NSTR MLD. In some embodiments, when a first MLD transmits a PPDU (that includes trigger information) to the NSTR MLD, the time duration from the end of trigger information until the end of the PPDU (minus the PE value of the PPDU) may be greater than or equal to the first time duration.

Examples of frame transmissions in which an MLD aligns the transmission end times via trigger information are described in further detail below with reference to FIGS. 7A-7B.

Figure 7A:
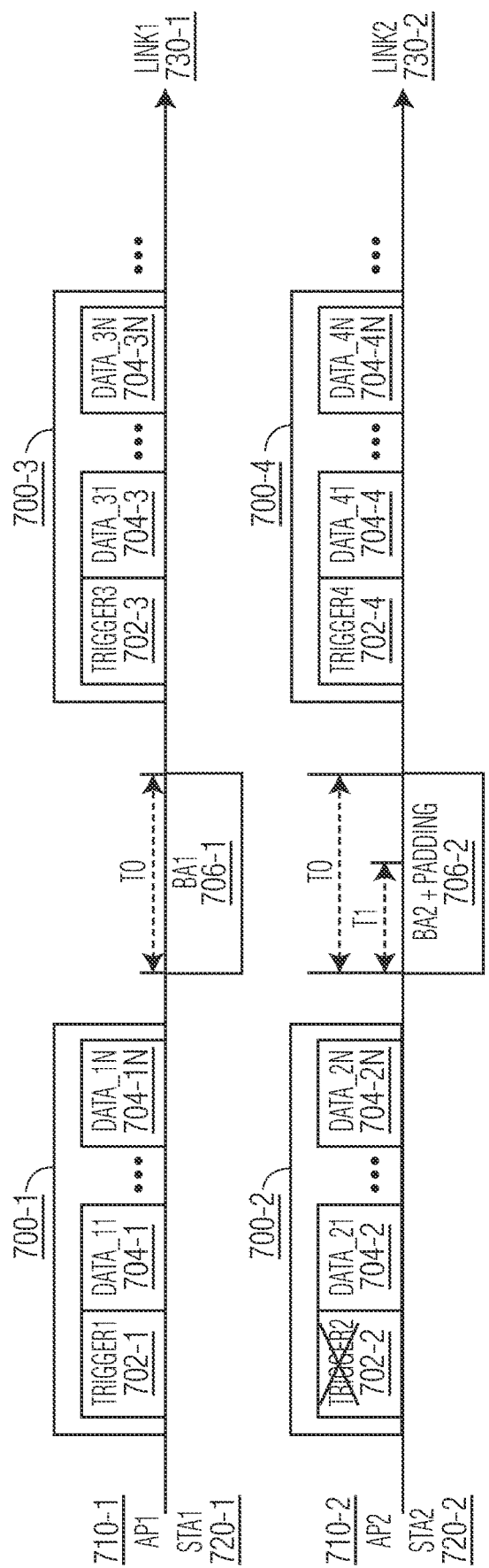
FIG. 7A illustrates an example of frame transmissions in which a multi-link device (MLD) aligns the transmission end times via trigger information.

FIG. 7A illustrates an example of frame transmissions in which an MLD aligns the transmission end times via trigger information. With reference to FIG. 7A, an AP MLD (not shown) with two affiliated APs, implemented as AP1 710-1 and AP2 710-2, may operate on Link1 730-1 and Link2 730-2, respectively. In addition, an NSTR non-AP MLD (not shown) with two affiliated STAs, implemented as STA1 720-1 and STA2 720-2, may associate with the APs of the AP MLD on Link1 730-1 and Link2 730-2, respectively. In an embodiment, AP1 710-1 may transmit a first PPDU 700-1 on Link1 730-1 to STA1 720-1 and AP2 710-2 may transmit a second PPDU 700-2 on Link2 730-2 to STA2 720-2 simultaneously, such that the transmission start/end times of the first PPDU 700-1 and the second PPDU 700-2 are aligned. In such an embodiment, the first PPDU 700-1 may include a first set of DL frames, implemented as Trigger1 702-1, Data_11 704-1, and Data_1N 704-1N, whereas the second PPDU 700-2 may include a second set of DL frames, implemented as Trigger2 702-2, Data_21 704-2, and Data_2N 704-2N, such that N represents an integer greater than one. As an example, Trigger1 702-1 and Trigger2 702-2 may each be Trigger frames that include trigger information which indicates a duration (T0) for a first immediate response frame (shown as BA1 706-1) and for a second immediate response frame (shown as BA2+Padding 706-2), respectively.

With reference to FIG. 7A, STA1 720-1 successfully receives Trigger1 702-1 included in the first PPDU 700-1 from AP1 710-1, so STA1 720-1 transmits the first immediate response frame (shown as BA1 706-1) such that the duration of the first immediate response frame is T0. In contrast, STA2 720-2 fails to receive and/or decode Trigger2 702-2 in the second PPDU 700-2 from AP2 710-2. However, STA2 720-2 identifies that the duration of the immediate response frame is T0 from Trigger1 702-1. Therefore, although the actual duration of the second immediate response frame is T1, STA2 720-2 transmits the second immediate response frame (shown as BA2+Padding 706-2) with the duration of T0 by adding padding. As the transmission start/end times of each of the immediate response frames on Link1 730-1 and Link2 730-2 are aligned, the AP MLD may continue transmission on each link with an aligned transmission start time.

With further reference to FIG. 7A, the AP MLD continues to transmit on each link with the aligned transmission start time via the transmission of a third PPDU 700-3 by AP1 710-1 to STA1 720-1 on Link1 730-1 and the transmission of a fourth PPDU 700-4 by AP2 710-2 to STA2 720-2 on Link2 730-2 simultaneously, such that the transmission start/end times of the third PPDU 700-3 and the fourth PPDU 700-4 are aligned. In such an embodiment, the third PPDU 700-3 may include a third set of DL frames, implemented as Trigger3 702-3, Data_31 704-3, and Data_3N 704-3N, whereas the fourth PPDU 700-4 may include a fourth set of DL frames, implemented as Trigger4 702-4, Data_41 704-4, and Data_4N 704-4N. As an example, Trigger3 702-3 and Trigger4 702-4 may each be Trigger frames that include trigger information which indicates a duration for subsequent immediate response frames on each link.

Figure 7B:
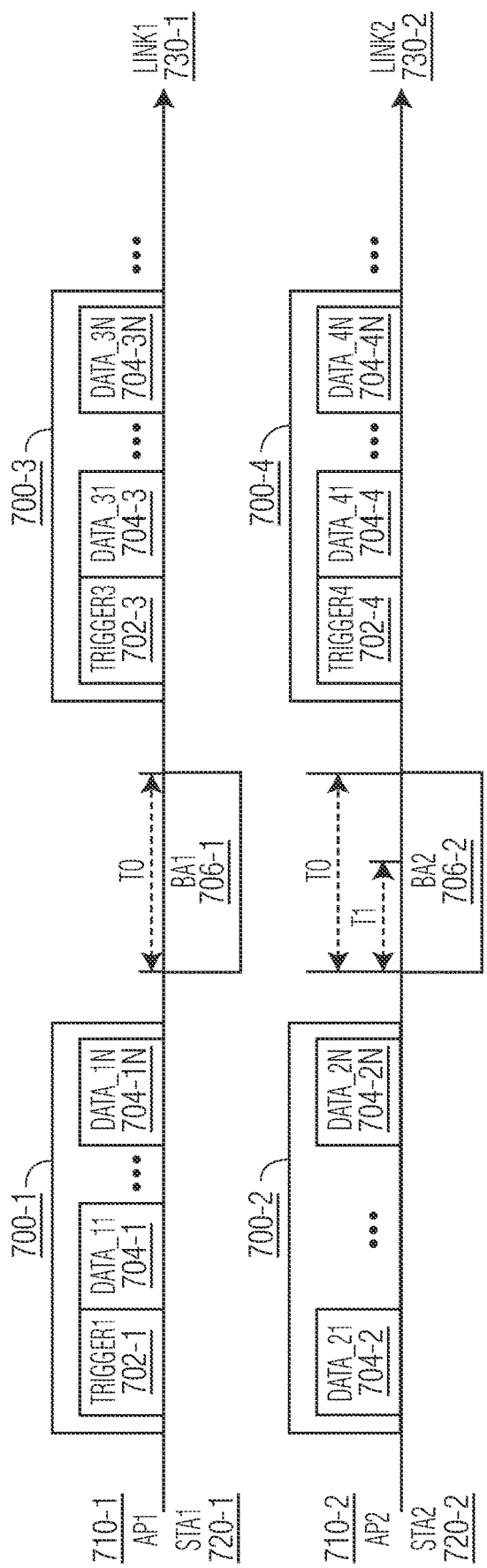
FIG. 7B illustrates another example of frame transmissions in which an MLD aligns the transmission end times via trigger information.

FIG. 7B illustrates another example of frame transmissions in which an MLD aligns the transmission end times via trigger information. With reference to FIG. 7B, an AP MLD (not shown) with two affiliated APs, implemented as AP1 710-1 and AP2 710-2, may operate on Link1 730-1 and Link2 730-2, respectively. In addition, an NSTR non-AP MLD (not shown) with two affiliated STAs, implemented as STA1 720-1 and STA2 720-2, may associate with the APs of the AP MLD on Link1 730-1 and Link2 730-2, respectively. In an embodiment, AP1 710-1 may transmit a first PPDU 700-1 on Link1 730-1 to STA1 720-1 and AP2 710-2 may transmit a second PPDU 700-2 on Link2 730-2 to STA2 720-2 simultaneously, such that the transmission start/end times of the first PPDU 700-1 and the second PPDU 700-2 are aligned. In such an embodiment, the first PPDU 700-1 may include a first set of DL frames, implemented as Trigger1 702-1, Data_11 704-1, and Data_1N 704-1N, whereas the second PPDU 700-2 may include a second set of DL frames, implemented as Data_21 704-2 and Data_2N 704-2N, such that N represents an integer greater than one, and such that the second PPDU 700-2 may not include the trigger information. As an example, Trigger1 702-1 may be a Trigger frame that includes trigger information which indicates a duration (T0) for a first immediate response frame (shown as BA1 706-1).

With reference to FIG. 7B, STA1 720-1 successfully receives Trigger1 702-1 included in the first PPDU 700-1 from AP1 710-1, so STA1 720-1 transmits the first immediate response frame (shown as BA1 706-1) such that the duration of the first immediate response frame is T0. In contrast, STA2 720-2 does not receive a Trigger frame in the second PPDU 700-2 from AP2 710-2. However, STA2 720-2 identifies that the duration of the immediate response frame is T0 from Trigger1 702-1. Therefore, although the actual duration of a second immediate response frame (shown as BA2 706-2) is T1, STA2 720-2 transmits the second immediate response frame with the duration of T0. As the transmission start/end times of each of the immediate response frames on Link1 730-1 and Link2 730-2 are aligned, the AP MLD may continue transmission on each link with an aligned transmission start time.

With further reference to FIG. 7B, the AP MLD continues to transmit on each link with the aligned transmission start time via the transmission of a third PPDU 700-3 by AP1 710-1 to STA1 720-1 on Link1 730-1 and the transmission of a fourth PPDU 700-4 by AP2 710-2 to STA2 720-2 on Link2 730-2 simultaneously, such that the transmission start/end times of the third PPDU 700-3 and the fourth PPDU 700-4 are aligned. In such an embodiment, the third PPDU 700-3 may include a third set of DL frames, implemented as Trigger3 702-3, Data_31 704-3, and Data_3N 704-3N, whereas the fourth PPDU 700-4 may include a fourth set of DL frames, implemented as Trigger4 702-4, Data_41 704-4, and Data_4N 704-4N. As an example, Trigger3 702-3 and Trigger4 702-4 may each be Trigger frames that include trigger information which indicates a duration for subsequent immediate response frames on each link.

In some embodiments, if an NSTR-MLD does not receive trigger information on the multiple links, then the NSTR MLD may determine a transmission duration for an immediate response to be equal to the transmission duration of a reference response frame. In one embodiment, the reference response frame may be an immediate response frame with the longest duration among each of the immediate response frames. In one embodiment, the reference response frame may be an immediate response frame with the shortest duration among each of the immediate response frames. In one embodiment, the reference response frame may be an immediate response frame on a predetermined link among each of the immediate response frames. In one embodiment, the reference response frame may be an immediate response frame on a link that includes a PPDU with trigger information. In one embodiment, the reference response frame may be an immediate response frame on a link that may be indicated by an AP MLD before transmission of a PPDU.

In some embodiments, the NSTR MLD may further identify that trigger information may be included in received PPDUs, but decoding of the trigger information fails. As an example, the NSTR MLD may identify that decoding of the trigger information failed on a link where trigger information was included in a PPDU (e.g., a first PPDU) if at least one of the conditions described herein are met. According to a first condition, decoding of a first A-MPDU subframe included in the PPDU fails. According to a second condition, decoding of the first A-MPDU subframe (excluding an acknowledgement frame) included in the PPDU fails. According to a third condition, a remaining TXOP Duration value from the PPDU may be less than a threshold value. According to a fourth condition, an Ack Policy of successfully decoded A-MPDU subframes may be Normal Ack or Implicit BAR. According to a fifth condition, a MAC header of successfully decoded A-MPDU subframes included in the PPDU may indicate that the transmission end time of a solicited immediate response frame on multiple links may be aligned. According to a sixth condition, trigger information may not be included in a MAC header portion of each A-MPDU subframe included in the PPDU.

In some embodiments, if decoding of trigger information fails at the NSTR MLD, then a non-HT (duplicate) PPDU format may be used to calculate a transmission duration of a first response frame (included in a second PPDU). In such an embodiment, the first response frame may be a reference response frame and/or an immediate response frame(s). In some embodiments, if decoding of trigger information fails at the NSTR MLD, then an HE PPDU format may be used to calculate the transmission duration of the first response frame if the transmission duration of the first response frame using the HE PPDU format is shorter than the transmission duration of the first response frame using the non-HT (duplicate) PPDU format (at a primary rate). In such an embodiment, the first response frame may be the reference response frame and/or the immediate response frame(s). In some embodiments, if decoding of trigger information fails at the NSTR MLD, then an EHT PPDU format may be used to calculate the transmission duration of the first response frame if the transmission duration of the first response frame using the EHT PPDU format is shorter than the transmission duration of the first response frame using the non-HT (duplicate) PPDU format (at the primary rate). In such an embodiment, the first response frame may be the reference response frame and/or the immediate response frame(s).

An example of frame transmissions in which an MLD fails to decode trigger information but continues to align transmission end times is described in further detail below with reference to FIG. 8.

Figure 8:
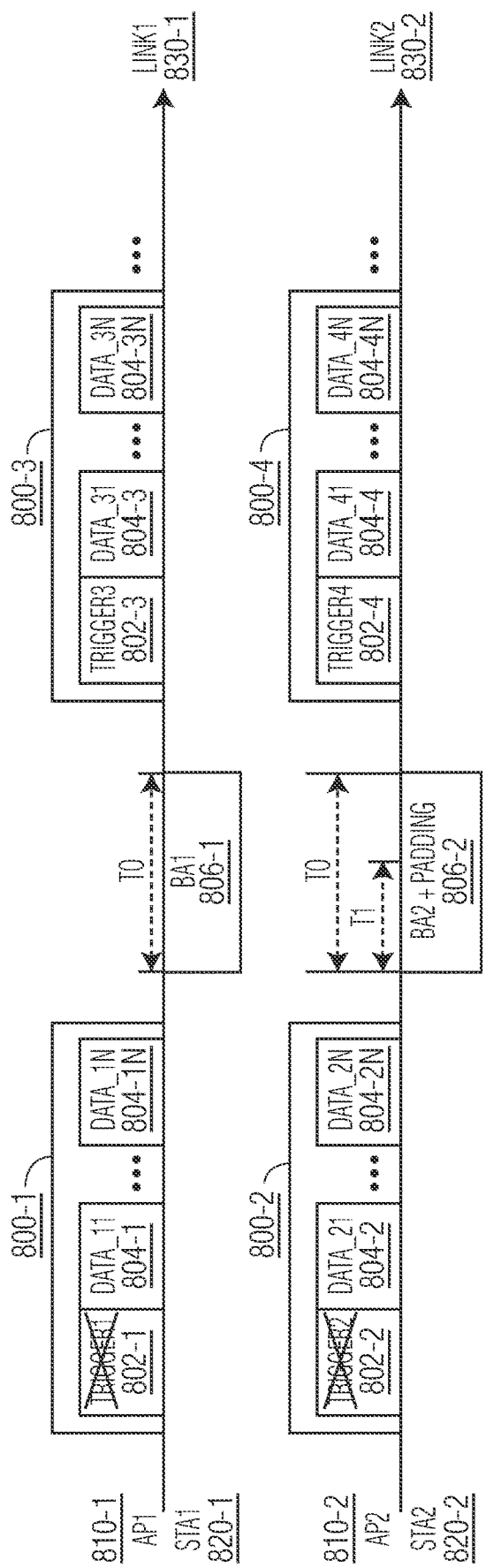
FIG. 8 illustrates an example of frame transmissions in which an MLD fails to decode trigger information but continues to align transmission end times.

FIG. 8 illustrates an example of frame transmissions in which an MLD fails to decode trigger information but continues to align transmission end times. With reference to FIG. 8, an AP MLD (not shown) with two affiliated APs, implemented as AP1 810-1 and AP2 810-2, may operate on Link1 830-1 and Link2 830-2, respectively. In addition, an NSTR non-AP MLD (not shown) with two affiliated STAs, implemented as STA1 820-1 and STA2 820-2, may associate with the APs of the AP MLD on Link1 830-1 and Link2 830-2, respectively. In an embodiment, AP1 810-1 may transmit a first PPDU 800-1 on Link1 830-1 to STA1 820-1 and AP2 810-2 may transmit a second PPDU 800-2 on Link2 830-2 to STA2 820-2 simultaneously, such that the transmission start/end times of the first PPDU 800-1 and the second PPDU 800-2 are aligned. In such an embodiment, the first PPDU 800-1 may include a first set of DL frames, implemented as Trigger1 802-1, Data_11 804-1, and Data_1N 804-1N, whereas the second PPDU 800-2 may include a second set of DL frames, implemented as Trigger2 802-2, Data_21 804-2, and Data_2N 804-2N, such that N represents an integer greater than one. As an example, Trigger1 802-1 and Trigger2 802-2 may each be Trigger frames that include trigger information that indicates a duration (T0) for a first immediate response frame (shown as BA1 806-1) and for a second immediate response frame (shown as BA2+Padding 806-2), respectively.

With reference to FIG. 8, STA1 820-1 and STA2 820-2 each fail to receive and/or decode Trigger1 802-1 and Trigger2 802-2 on Link1 830-1 and Link2 830-2, respectively. Without knowing the trigger information included in Trigger1 802-1 and Trigger2 802-2, the NSTR non-AP MLD may use an estimated duration of T0 for the first immediate response frame (shown as BA1 806-1) and an estimated duration of T1 for the second immediate response frame. However, even though the actual duration of the second immediate response frame is T1, STA2 820-2 transmits the second immediate response frame (shown as BA2+Padding 806-2) with the duration of T0 by adding padding, such that the first immediate response frame and the second immediate response frame have the same duration. As the transmission start/end times of each of the immediate response frames on Link1 830-1 and Link2 830-2 are aligned, the AP MLD may continue transmission on each link with an aligned transmission start time.

With further reference to FIG. 8, the AP MLD continues to transmit on each link with the aligned transmission start time via the transmission of a third PPDU 800-3 by AP1 810-1 to STA1 820-1 on Link1 830-1 and the transmission of a fourth PPDU 800-4 by AP2 810-2 to STA2 820-2 on Link2 830-2 simultaneously, such that the transmission start/end times of the third PPDU 800-3 and the fourth PPDU 800-4 are aligned. In such an embodiment, the third PPDU 800-3 may include a third set of DL frames, implemented as Trigger3 802-3, Data_31 804-3, and Data_3N 804-3N, whereas the fourth PPDU 800-4 may include a fourth set of DL frames, implemented as Trigger4 802-4, Data_41 804-4, and Data_4N 804-4N. As an example, Trigger3 802-3 and Trigger4 802-4 may each be Trigger frames that include trigger information which indicates a duration for subsequent immediate response frames on each link.

In some embodiments, an NSTR non-AP MLD may receive PPDUs that are sent to the NSTR non-AP MLD on multiple link simultaneously, such that the transmission end times of the PPDUs are aligned, and such that the PPDUs solicit immediate response frames on multiple links. In such an embodiment, if the NSTR non-AP MLD does not receive trigger information on a first link within the multiple links, then the NSTR non-AP MLD may not respond and transmit the immediate response frame on the first link. In one embodiment, the NSTR non-AP MLD may further consider that the trigger information may be included in a PPDU on the first link within the PPDUs.

As an example, the NSTR non-AP MLD may consider that the trigger information may be included in the PPDU if at least one of the conditions described herein are met. According to a first condition, decoding of a first A-MPDU subframe included in the PPDU fails. According to a second condition, decoding of the first A-MPDU subframe (excluding an Ack frame) included in the PPDU fails. According to a third condition, a remaining TXOP Duration value from the PPDU may be less than a threshold value. According to a fourth condition, an Ack Policy of successfully decoded A-MPDU subframes may be Normal Ack or Implicit BAR. According to a fifth condition, a MAC header of successfully decoded A-MPDU subframes included in the PPDU may indicate that the transmission end time of a solicited immediate response frame on multiple links may be aligned. According to a sixth condition, trigger information may not be included in a MAC header portion of each A-MPDU subframe included in the PPDU.

In some embodiments, a (modified) Trigger frame may be used for trigger information. In such an embodiment, when the (modified) Trigger frame is used for trigger information, a first MLD may transmit a first PPDU that includes a first Trigger frame and a first set of data frames on a first link to a second MLD. In addition, in such an embodiment, the first MLD may simultaneously transmit, with the first PPDU on the first link, a second PPDU that includes a second Trigger frame and a second set of data frames on a second link to the second MLD. In such an embodiment, the first Trigger frame and the second Trigger frame may each solicit a TB PPDU with the same PPDU duration (or nearly the same PPDU duration). In such an embodiment, if the second MLD fails to decode the first Trigger frame while the second MLD successfully decodes the first set of data frames, based on a baseline rule, because an Ack Policy field of the first set of data frames may be set to a High Throughput (HTP) Ack and because UL resource allocation information (included in the first Trigger frame) may not be received, then the second MLD cannot transmit an immediate response frame.

To overcome failed decoding at a second MLD (that includes a second STA and a fourth STA), a first MLD (that includes a first STA and a third STA) that sends a PPDU soliciting an immediate response frame may set an Ack Policy Indication subfield to Normal Ack or Implicit BAR for a single-STA response. As an example, the first STA of the first MLD may transmit a first PPDU to the second STA of the second MLD, such that the first PPDU includes a Trigger frame and an MPDU that solicits an immediate response carried in a TB PPDU that may set the Ack Policy Indication subfield to Normal Ack or Implicit BAR for a single-STA response if one STA (e.g., the second STA) transmits the TB PPDU in response to the reception of the first PPDU. Examples of the TB PPDU as described herein may imply a conventional HE TB PPDU and/or a conventional EHT TB PPDU, or a modified version of an HE/EHT TB PPDU.

In one embodiment, the third STA of the first MLD may also transmit another PPDU (e.g., a second PPDU) on another link to the fourth STA of the second MLD, such that the first PPDU and the other PPDU each solicit a response frame (e.g., an immediate response frame) on each PPDU's respective link. In such an embodiment, a difference between a transmission end time of the first PPDU and a transmission end time of the other PPDU may be within a first predetermined margin, and such that a difference between a transmission end time of the response frame to the first PPDU and a transmission end time of the other response frame to the other PPDU may be within a second predetermined margin. Examples of the first predetermined margin may include, e.g., SIFS/4 or SIFS/2. In addition, examples of the second predetermined margin may include, e.g., zero, SIFS/4, or SIFS/2.

In another embodiment, the third STA of the first MLD may also transmit another PPDU (e.g., a second PPDU) on another link to the fourth STA of the second MLD, such that the first PPDU and the other PPDU each solicit a response frame (e.g., an immediate response frame) on each PPDU's respective link. In such an embodiment, a difference between a transmission end time of the first PPDU and a transmission end time of the other PPDU may be within a first predetermined margin, and such that a difference between a duration of the response frame to the first PPDU and a duration of the other response frame to the other PPDU may be within a second predetermined margin. Examples of the first predetermined margin may include, e.g., SIFS/4 or SIFS/2. In addition, examples of the second predetermined margin may include, e.g., zero, SIFS/4, or SIFS/2.

In some embodiments, an NSTR MLD may receive a first PPDU that solicits a first immediate response frame on a first link and a second PPDU that solicits a second immediate response frame on a second link, such that the difference between a duration of the first immediate response frame and a duration of the second immediate response frame may be within a first margin. In such an embodiment, the first immediate response frame and the second immediate response frame may use a TB PPDU format if a Trigger frame is used to control the duration of the first immediate response frame and the second immediate response frame. However, use of the TB PPDU format may not be preferred considering protection as specified according to legacy communication protocols. Therefore, to allow a non-TB PPDU format to be used for the first immediate response frame and the second immediate response frame, an indication may be included in the Trigger frames of the PPDUs.

For such an indication to be included in the Trigger frames of the PPDUs, an SU PPDU response may be used. As described herein an SU PPDU may imply a PPDU format that may not be a TB PPDU and/or an MU PPDU, and implies a PPDU format that may be used for a single STA to occupy a whole transmission resource (unless otherwise specifically indicated).

In some embodiments, a first MLD may receive a first PPDU that solicits a first immediate response frame on a first link, such that the first PPDU includes a Trigger frame and a first data frame. In such an embodiment, the first MLD may transmit the first immediate response frame using a non-TB PPDU format (or an SU PPDU format) if an Ack Policy Indication subfield of the first data frame is set to Normal Ack or Implicit BAR.

In one embodiment, the first MLD may also receive a second PPDU that solicits a second immediate response frame on a second link, such that a difference between a transmission end time of the first PPDU and the second PPDU may be within a first margin, and such that a transmission end time of the first immediate response frame and the second immediate response frame may be within a second margin. Examples of the first margin may include, e.g., SIFS/4 or SIFS/2. In addition, examples of the second margin may include, e.g., zero, SIFS/4, or SIFS/2.

In another embodiment, the first MLD may also receive the second PPDU that solicits the second immediate response frame on the second link, such that the difference between the transmission end time of the first PPDU and the second PPDU may be within the first margin, and such that a duration of the first immediate response frame and the second immediate response frame may be within a second margin. Examples of the first margin may include, e.g., SIFS/4 or SIFS/2. In addition, examples of the second margin may include, e.g., zero, SIFS/4, or SIFS/2.

In some embodiments, a (modified) Trigger frame may be used for trigger information. In such an embodiment, when the (modified) Trigger frame is used for trigger information, a first MLD may transmit a first PPDU that includes a first Trigger frame and a first set of data frames on a first link to a second MLD. In addition, in such an embodiment, the first MLD may simultaneously transmit, with the first PPDU on the first link, a second PPDU that includes a second Trigger frame and a second set of data frames on a second link to the second MLD. In such an embodiment, the first Trigger frame and the second Trigger frame may each solicit a TB PPDU with the same PPDU duration (or nearly the same PPDU duration). In such an embodiment, if the second MLD fails to decode the first Trigger frame while the second MLD successfully decodes the first set of data frames, then the second MLD may not know a duration of the solicited immediate response frame because the first Trigger frame includes trigger information on the duration of the immediate response frame.

To allow the second MLD that may not know the duration of the solicited immediate response frame (because of a failure to decode the first trigger frame) to know the duration, the second MLD may determine the duration for the first immediate response frame based on trigger information for the duration of the second immediate response frame. As an example, when an NSTR MLD (e.g., second MLD) receives a first PPDU on a first link and a second PPDU on a second link simultaneously, and such that the NSTR MLD successfully decodes a first data frame (included in the first PPDU) whose Ack Policy may be set to Normal Ack or Implicit BAR, but does not successfully decode trigger information included in the first PPDU, then the NSTR MLD may determine a duration of a first immediate response frame (solicited by the first PPDU) from trigger information on a duration of a second immediate response frame (solicited by the second PPDU). In such an embodiment, a difference between a transmission end time of the first PPDU and a transmission end time of the second PPDU may be within a first threshold value (e.g., SIFS/4 or SIFS/2). In such an embodiment, a frame format of the first immediate response frame may be a TB PPDU format or an SU PPDU format. In such an embodiment, the second PPDU may also include trigger information that indicates the duration of the second immediate response frame.

Additionally, in some embodiments, the NSTR MLD may transmit the first immediate response frame if the second PPDU includes trigger information that indicates the duration of the second immediate response frame. In some embodiments, the NSTR MLD may transmit the first immediate response frame if an estimated duration of the first immediate response frame (without considering trigger information on duration of the second immediate response frame) is longer than the duration of the second immediate response frame. In some embodiments, the NSTR MLD may transmit the first immediate response frame if an estimated duration of the first immediate response frame (without considering trigger information on duration of the second immediate response frame) is shorter than the duration of the second immediate response frame. In some embodiments, the NSTR MLD may transmit the first immediate response frame if a difference between the estimated duration of the first immediate response frame (without considering trigger information on duration of the second immediate response frame) and the duration of the second immediate response frame is within a first threshold value (e.g., SIFS/4 or SIFS/2).

In some embodiments, when an NSTR MLD (e.g., second MLD) receives a first PPDU on a first link and a second PPDU on a second link simultaneously, and such that the NSTR MLD successfully decodes a first data frame (included in the first PPDU) whose Ack Policy may be set to Normal Ack or Implicit BAR, but does not successfully decode trigger information included in the first PPDU, then the NSTR MLD may transmit a first immediate response frame to the first PPDU if the NSTR MLD can estimate a duration of the first immediate response frame such that a difference between a transmission end time of the first immediate response frame and a transmission end time of a second immediate response frame to the second PPDU may be within a first value (e.g., SIFS/4 or SIFS/2). In such an embodiment, the difference between the transmission end time of the first PPDU and the transmission end time of the second PPDU may also be within a first threshold value (e.g., SIFS/4 or SIFS/2). In such an embodiment, a frame format of the first immediate response frame may be a TB PPDU format or an SU PPDU format. In such an embodiment, a frame format of the second immediate response frame may be a TB PPDU format or an SU PPDU format.

Additionally, in some embodiments, the NSTR MLD may estimate the duration of the first immediate response frame based on trigger information of a second immediate response frame to the second PPDU. In some embodiments, if the NSTR MLD cannot estimate the duration of the first immediate response frame, then the NSTR MLD may not transmit the first immediate response frame. In some embodiments, if the NSTR MLD does not successfully receive trigger information from the second PPDU, then the NSTR MLD may not transmit the first immediate response frame.

Figure 9:
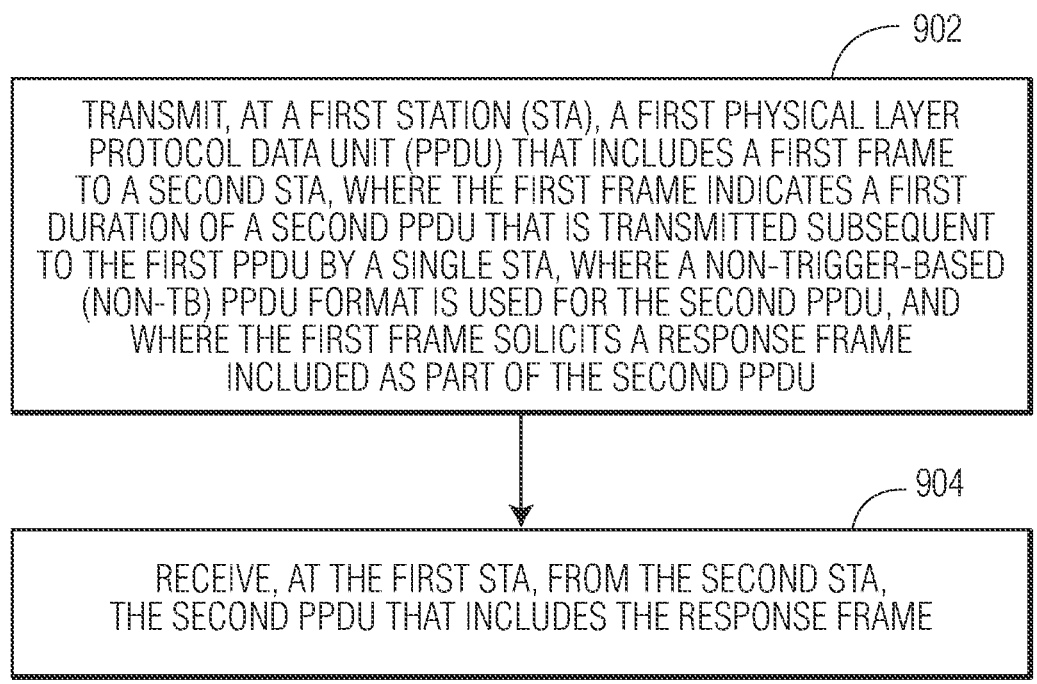
FIG. 9 illustrates a flow diagram of a technique for wireless communications in accordance with an embodiment of the invention.

FIG. 9 illustrates a flow diagram of a technique for wireless communications in accordance with an embodiment of the invention. At block 902, a first STA transmits a first PPDU that includes a first frame to a second STA, where the first frame indicates a first duration of a second PPDU that is transmitted subsequent to the first PPDU by a single STA, where a non-TB PPDU format is used for the second PPDU, and where the first frame solicits a response frame included as part of the second PPDU. At block 904, the first STA receives, from the second STA, the second PPDU that includes the response frame.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A first station (STA) for wireless communications comprising: a processor configured to,
    transmit a first Physical Layer Protocol Data Unit (PPDU) that includes a first frame to a second STA,
    wherein the first frame indicates a first duration of a second PPDU that is transmitted subsequent to the first PPDU by the second STA, wherein a non-Trigger-Based (non-TB) PPDU format is used for the second PPDU,
wherein the first frame solicits a response frame included as part of the second PPDU; and
receive from the second STA, the second PPDU that includes the response frame;
wherein the first STA and a third STA are affiliated with a first MLD (multi-link device) and the second STA and a fourth STA are affiliated with a second MLD;
wherein the third STA transmits another PPDU which solicits another response frame on another link to the fourth STA;
wherein a difference between a transmission end time of the first PPDU and a transmission end time of the other PPDU is within a first predetermined margin; and
wherein a difference between a transmission end time of the response frame to the first PPDU and a transmission end time of the other response frame to the other PPDU is within a second predetermined margin.

2. The first STA of claim 1,
wherein the first frame explicitly indicates the first duration of the second PPDU.

3. The first STA of claim 1,
wherein the first frame implicitly indicates the first duration of the second PPDU.

4. The first STA of claim 1,
wherein an A-Control subfield of a Media Access Control (MAC) header portion of the first frame indicates the first duration of the second PPDU that is transmitted subsequent to the first PPDU by the second STA, and
wherein the non-TB PPDU format is used for the second PPDU.

5. The first STA of claim 1,
wherein the first duration of the second PPDU is a maximum allowable duration indicated by a Single Response Scheduling (SRS) control subfield of an A-Control subfield in a MAC header portion of the first frame.

6. The first STA of claim 1,
wherein the second STA transmits the second PPDU in response to the reception of the first PPDU, and
wherein a difference between the first duration of the second PPDU indicated by the first PPDU and an actual duration of the second PPDU is less than a threshold value.

7. The first STA of claim 1,
wherein the second STA determines a PPDU format for the second PPDU.

8. The first STA of claim 7,
wherein the PPDU format for the second PPDU is at least one of a High-Efficiency (HE) PPDU and an Extremely High Throughput (EHT) PPDU.

9. The first STA of claim 1,
wherein the second STA determines a Modulation and Coding Scheme (MCS) for the second PPDU that is no greater than the MCS of the first PPDU.

10. The first STA of claim 1,
wherein the second STA determines a data rate for the second PPDU that is no greater than the data rate of the first PPDU.

11. The first STA of claim 1,
wherein the first STA indicates that the first STA is capable of aligning transmission end times of downlink (DL) PPDUs that are transmitted simultaneously on multiple links to the second STA and up-link (UL) PPDUs that are subsequently scheduled simultaneously on multiple links from the second STA.

12. The first STA of claim 11,
wherein at least one of the DL PPDUs transmitted by the first STA includes trigger information.

13. The first STA of claim 11,
wherein the DL PPDUs indicate that the first STA intends to continue DL transmissions after receiving the UL PPDUs from the second STA.

14. The first STA of claim 13,
wherein the DL PPDUs transmitted after receiving the UL PPDUs from the second STA avoid overlap with subsequent UL PPDUs from the second STA.

15. The first STA of claim 1,
wherein the first PPDU includes a Trigger frame and a MAC Protocol Data Unit (MPDU) which solicit a response included in a Trigger-Based (TB) PPDU from the second STA, and
wherein an Acknowledgement (Ack) Policy is set to at least one of a Normal Ack and an Implicit Block Ack Request (BAR) in the first MPDU included in the first PPDU.

16. The first STA of claim 1,
wherein the first STA and the third STA are affiliated with the first MLD (multi-link device) and the second STA and the fourth STA are affiliated with the second MLD;
wherein the third STA transmits another PPDU which solicits another response frame on another link to the fourth STA;
wherein the difference between the transmission end time of the first PPDU and the transmission end time of the other PPDU is within the first predetermined margin; and
wherein a difference between a duration of the response frame to the first PPDU and a duration of the other response frame to the other PPDU is within the second predetermined margin.

17. The first STA of claim 1,
wherein the first STA and the second STA are compatible with an Institute of Electrical and Electronics Engineers (IEEE) 802.11 protocol.

18. A method for wireless communications, the method comprising:
at a first station (STA), transmitting a first Physical Layer Protocol Data Unit (PPDU) that includes a first frame to a second STA,
wherein the first frame indicates a first duration of a second PPDU that is transmitted subsequent to the first PPDU by a single STA,
wherein a non-Trigger-Based (non-TB) PPDU format is used for the second PPDU, and
wherein the first frame solicits a response frame included as part of the second PPDU; and
at the first STA, receiving from the second STA, the second PPDU that includes the response frame;
wherein the first STA and a third STA are affiliated with a first MLD (multi-link device) and the second STA and a fourth STA are affiliated with a second MLD;
wherein the third STA transmits another PPDU which solicits another response frame on another link to the fourth STA;
wherein a difference between a transmission end time of the first PPDU and a transmission end time of the other PPDU is within a first predetermined margin; and
wherein a difference between a transmission end time of the response frame to the first PPDU and a transmission end time of the other response frame to the other PPDU is within a second predetermined margin.

19. A method for wireless communications, the method comprising:
- at a first station (STA), transmitting a first Physical Layer Protocol Data Unit (PPDU) that includes a first frame to a second STA,
- wherein the first frame indicates a first duration of a second PPDU that is transmitted subsequent to the first PPDU by a single STA,
- wherein a non-Trigger-Based (non-TB) PPDU format is used for the second PPDU, and
- wherein the first frame solicits a response frame included as part of the second PPDU; and
- at the first STA, receiving from the second STA, the second PPDU that includes the response frame;
- wherein the first STA and a third STA are affiliated with a first MLD (multi-link device) and the second STA and a fourth STA are affiliated with a second MLD;
- wherein the third STA transmits another PPDU which solicits another response frame on another link to the fourth STA;
- wherein a difference between a transmission end time of the first PPDU and a transmission end time of the other PPDU is within a first predetermined margin; and
- wherein a difference between a duration of the response frame to the first PPDU and a duration of the other response frame to the other PPDU is within a second predetermined margin.

* * * * *